US007209923B1

(12) United States Patent
Cooper

(10) Patent No.: US 7,209,923 B1
(45) Date of Patent: Apr. 24, 2007

(54) ORGANIZING STRUCTURED AND UNSTRUCTURED DATABASE COLUMNS USING CORPUS ANALYSIS AND CONTEXT MODELING TO EXTRACT KNOWLEDGE FROM LINGUISTIC PHRASES IN THE DATABASE

(76) Inventor: Richard G. Cooper, 725 Center St., Costa Mesa, CA (US) 92627

( * ) Notice: Subject to any disclaimer, the term of this patent is extended or adjusted under 35 U.S.C. 154(b) by 0 days.

(21) Appl. No.: 11/337,359

(22) Filed: Jan. 23, 2006

(51) Int. Cl.
G06F 17/00 (2006.01)
G06F 7/00 (2006.01)
(52) U.S. Cl. ...................................... 707/100
(58) Field of Classification Search ................ 707/1, 707/3, 100, 200, 101
See application file for complete search history.

(56) References Cited

U.S. PATENT DOCUMENTS

| | | | | |
|---|---|---|---|---|
| 6,526,399 | B1* | 2/2003 | Coulson et al. ................ | 707/1 |
| 6,845,375 | B1* | 1/2005 | Sinclair ...................... | 707/100 |
| 6,980,976 | B2* | 12/2005 | Alpha et al. .................... | 707/1 |
| 2004/0243408 | A1* | 12/2004 | Gao et al. .................... | 704/240 |
| 2005/0060158 | A1* | 3/2005 | Endo et al. .................. | 704/275 |
| 2005/0198011 | A1* | 9/2005 | Barsness et al. ................ | 707/3 |
| 2005/0256863 | A1* | 11/2005 | Crivella et al. ................. | 707/4 |
| 2006/0059130 | A1* | 3/2006 | Weiss et al. .................... | 707/3 |
| 2006/0085750 | A1* | 4/2006 | Easton et al. ................ | 715/708 |

* cited by examiner

*Primary Examiner*—Sam Rimell
*Assistant Examiner*—Alicia Lewis

(57) ABSTRACT

Corpus analysis methods have previously been applied to text, typically to annotated text. The invention shows how to apply corpus analysis methods to information captured in databases, where the database columns include a mixture of both structured domains and unstructured domains containing text. It uses case-based methods to automatically organize cases for periodic review. The invention can help to identify opportunities for increasing knowledge about databases. By organizing a database around common lexical, semantic, pragmatic and syntactic relationships, the invention can be used to increase the effectiveness of previous corpus analysis methods, and to apply them to a diversity of commercial applications. The invention applies contextual constraints to focus the application of linguistic methods. This invention can provide a component for medical records, enterprise databases, information retrieval, question answering systems, interactive robots, interactive appliances, linguistically competent speech recognition, speech understanding and many other useful devices and applications that require a high level of linguistic competence within operational contexts.

19 Claims, 25 Drawing Sheets

TABLES 200

| Table_Name | 201 |
|---|---|
| Tables | |
| Domains | |
| Columns | |
| Constraints | |
| Primary_Keys | 202 |
| Foreign_Keys | |

DOMAINS 210

| Domain_Name 215 | |
|---|---|
| Boolean | |
| Char | 213 |
| Column | |
| Database | 211 |
| Date | |
| DateTime | |
| Domain | 212 |
| Integer | |
| Money | |
| Real | |
| String | |
| Table | 214 |

COLUMNS 220

| Table — 221 | Column 222 | Domain 223 |
|---|---|---|
| Tables | Table_Name | String |
| Domains | Domain_Name | String |
| Columns | Table | String |
| Columns | Column | String |
| Constraints | Name | String |
| Primary_Keys | Name | String |
| Primary_Keys | Table | String |
| Primary_Keys | Column | String |
| Foreign_Keys | Table | String |
| Foreign_Keys | Column | String |
| Foreign_Keys | Key_Table | String |
| Foreign_Keys | Key_Column | String |

CONSTRAINTS — 300

| Name |
|---|
| Primary_Key — 301 |
| Foreign_Key — 302 |

PRIMARY_KEYS — 310

| Name — 312 | Table — 313 | Column — 311 |
|---|---|---|
| Tables | | Table_Name |
| Domains | | Domain_Name |
| Columns_Table | Columns — 315 | Table — 316 |
| Columns_Column | Columns — 315 | Column — 317 |
| Constraints | | Name |
| Primary_Keys | | Name |
| Foreign_Keys | | Name |

FOREIGN_KEYS — 320

| Name — 321 | Table | Column | Key_Table | Key_Column |
|---|---|---|---|---|
| Columns_Table | Columns | Table | Tables | Table_Name |
| Columns_Domain | Columns | Domain | Domains | Domain_Name — 314 |
| Primary_Keys_Table | Primary_Keys | Table | Tables | Table_Name |
| Primary_Keys_Column | Primary_Keys | Column | Columns | Column |
| Foreign_Keys_Table | Foreign_Keys | Table | Tables | Table_Name |
| Foreign_Keys_Column | Foreign_Keys | Column | Columns | Column |
| Foreign_Keys_Key_Table | Foreign_Keys | Key_Table | Tables | Table_Name |
| Foreign_Keys_Key_Column | Foreign_Keys | Key_Column | Columns | Column |

Elk's Stylized English

_brand contains _medication —————1101
_brand surpresses _function —————1102

>Vicodin contains acetaminophen. —————1105
>Vicodin contains hydrocodone. —————1106
>Hydrocodone surpresses the CNS. —————1109

>if _medication surpresses the CNS —————1112
and _brand contains _medication
then _brand surpresses the CNS.

>?_what surpresses the CNS. —————1114
Hydrocodone surpresses the CNS.
Vicodin surpresses the CNS.

Equivalent First Order Logic contains(_brand, _medication) —————1103
surpresses(_brand, _function) —————1104

>contains(vicodin, acetaminophen) —————1107
>contains(vicodin, hydrocodone) —————1108
>surpresses(hydrocodone, the CNS). —————1110

>surpresses(_medication, the CNS), —————1113
contains(_brand, _medication) =>
surpresses(_brand, the CNS).

>?surpresses(_medication, the CNS), —————1115
surpresses(hydrocodone, the CNS).
surpresses(vicodin, the CNS).

| Interactions | Experimenting | Classifying | Observing | Theorizing |
|---|---|---|---|---|
| Experimenting | *1400A. Corpus analysis to identify positives, negatives, false positives and false negatives* | 1403. Use experiments to develop new categories of words, phrases, objects and activities | Use experiments to specialize databases, and focus observations | 1402. Use experiments to validate or invalidate theories |
| Classifying | Use classifications and relationships to identify objects and activities to explore in experiments | *1400B. Categorize words, phrases, patterns, objects, activities, agents and relationships* | Use Classification and clustering to observe evidence based on categories | Use classifications to partition databases into instances of objects, activities, and explanations about them |
| Observing | 1412. Use observed cases and partitions for data in experiments | 1406. Use observed cases and partitions to define classes | *1400C. Construct and annotate corpora, organize partitions into cases* | 1407. Observe whether theories are supported by partitions and cases |
| Theorizing | Postulates can influence and suggest refinements of experiments | Variables can be bound to classes, and predicates can be postulated | Observations can be refined using theorizing | *1400D. Propose logical relationships among corpus objects, words and phrases* |

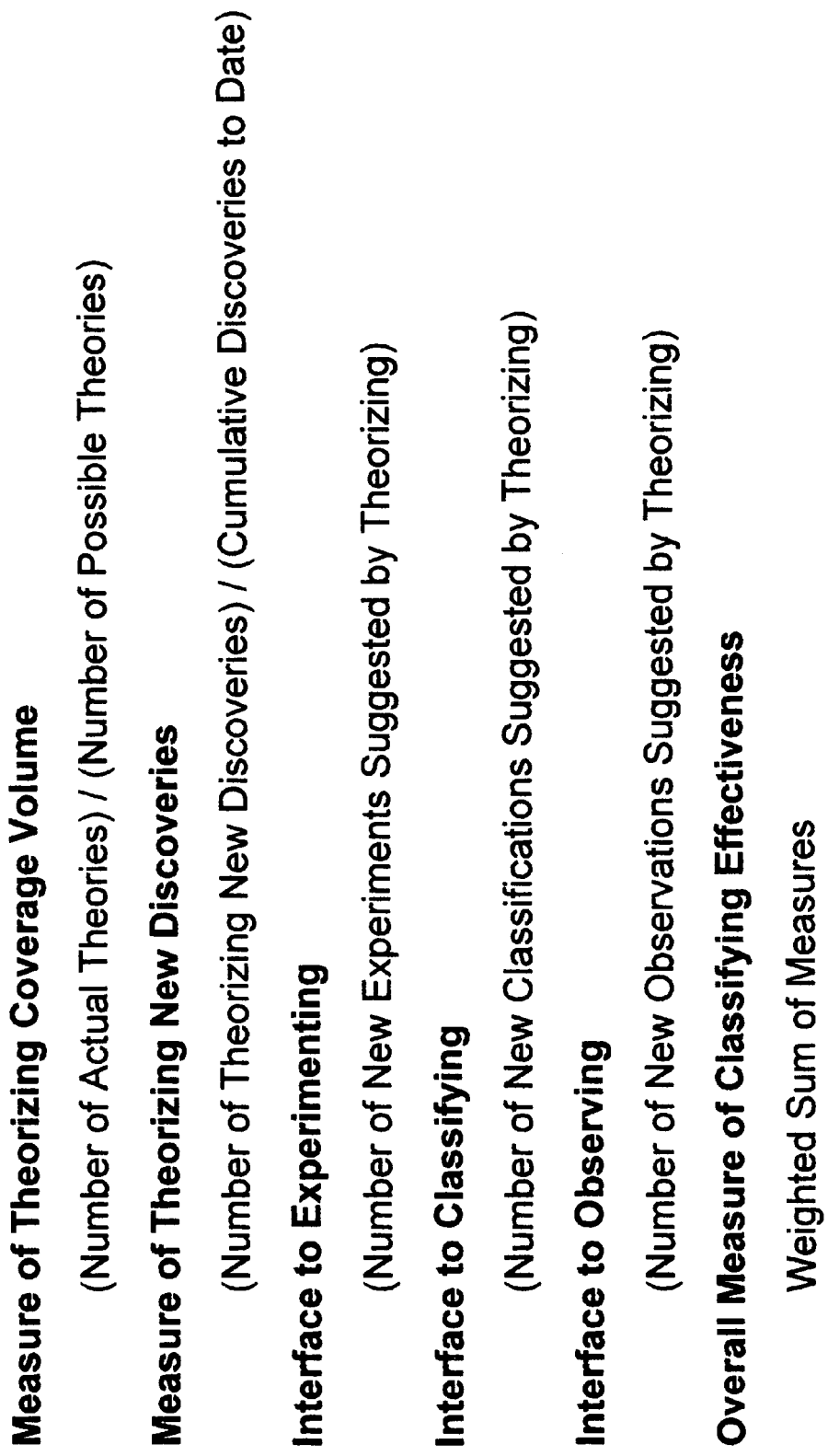

Measure of Theorizing Coverage Volume

(Number of Actual Theories) / (Number of Possible Theories)

Measure of Theorizing New Discoveries

(Number of Theorizing New Discoveries) / (Cumulative Discoveries to Date)

Interface to Experimenting

(Number of New Experiments Suggested by Theorizing)

Interface to Classifying

(Number of New Classifications Suggested by Theorizing)

Interface to Observing

(Number of New Observations Suggested by Theorizing)

Overall Measure of Classifying Effectiveness

Weighted Sum of Measures

Figure 22.

Measure of Discovery Coverage Volume

(Number of Actual Discoveries) / (Number of Possible Discoveries)

Measure of New Discoveries

(Number of New Discoveries) / (Cumulative Discoveries to Date)

Costs of Experimenting

(Labor Costs, Schedule Costs)

Costs of Classifying

(Labor Costs, Schedule Costs)

Costs of Observing

(Labor Costs, Schedule Costs)

Costs of Theorizing

(Labor Costs, Schedule Costs)

Overall Measure of Discovery Effectiveness

Weighted Sum of Measures

Figure 23.

1. Measurements

Every application will have specifically defined measures of performance, mission effectiveness, success measures, cost measures, and value measures. Measurements will be stored in a history database.

2. Performance Models

Use linear system and a requirements database to model and predict the performance of each application based on its history and its success feedback.

3. Performance Reviews

Refine measurements and models of the deployment process as necessary to formulate and approach optimal control of the learning process.

4. Iterate Periodically

All processes, including the application deployment process, will be measured, modeled and reviewed to ensure exponential learning.

Figure 24.

ORGANIZING STRUCTURED AND UNSTRUCTURED DATABASE COLUMNS USING CORPUS ANALYSIS AND CONTEXT MODELING TO EXTRACT KNOWLEDGE FROM LINGUISTIC PHRASES IN THE DATABASE

BACKGROUND OF THE INVENTION

1. Field of Invention

This invention relates to a method for discovering knowledge from databases; specifically, it applies corpus linguistic analysis techniques to unstructured text columns within the database, focused by partitioning the many contexts described in both structured and unstructured columns, to organize language within context into knowledge.

The present widespread use of database technologies has resulted in a large volume of unstructured text columns as well as structured columns. There is a strong economic motive for enterprises with such databases to extract information from the unstructured columns. So far, there is little support for this requirement. There are data mining and text mining approaches that extract information according to formal rules, but these approaches are based on word and phrase forms, not on an understanding of linguistic usage and meaning. Corpus linguistics techniques, which are described below, provide a way to apply linguistic technologies to extract meaning from texts. But there are no methods that describe how to use corpus analysis methods on the unstructured columns, integrated with formal database columns, as a guide to linguistic interpretation.

Practically every modern enterprise uses a database management system to store operational information. One example is the Veteran's Health Information System and Technology Architecture (VISTA) which is a suite of programs and databases used at the Veteran's Administration (VA) hospitals and clinics on a daily basis. The VA placed VISTA into the open source community so that other hospitals and health-care enterprises could apply electronic medical records technology to their businesses at low cost. At the time of this filing, there are thousands of hospitals and clinics which use VISTA software. Over 50 million visits per year are recorded in the VISTA databases.

VISTA has over 1,940 files and over 44,960 data fields. VISTA does not use relational databases at present, but efforts are being conducted to map VISTA into relational database form for knowledge extraction. Third party software companies are already installing relational versions of VISTA in health care enterprises at the time of this filing. Thus relational databases with tens of thousands of columns of information are presently being used, but extraction of operational knowledge from these databases is at best an expensive custom programming project.

As in most databases, some of the VISTA information is in unstructured text. Columns related to radiology, patient history, physical information and discharge notes, among many others, can only be extracted as narrative text, and require additional software for extracting knowledge, formatting it into structured columns, for subsequent analysis.

The large national Health Data Repository (HDR) is being developed from the databases produced by the VISTA medical information system at selected hospitals. The team will integrate the various representations in both structured and unstructured columns so that health care data can be studied by researchers, and so that the next versions of VISTA can provide interchangeability among medical health records. Prior to this planned effort the databases are not compatible. The team will expend significant effort in correcting the various databases to use the same terminology.

Computational linguistic competence is an important technology for the future. This capability is needed in such applications as question answering, information retrieval, robotics, interactive appliances, interactive vehicles, speech recognition, speech understanding, data mining and text mining. It is a required enabler so high competence speech recognition can be achieved. Having a highly competent linguistic capability could support greater competence when the ambiguities inherent in human language are made tractable for providing feedback to speech recognizers and situation understanders.

Even small text columns in databases have the issues of data cleansing. Various sites use different words for the same concepts. For example, there are 3,396 columns that hold a Yes/No value. These were recorded in 30 different conventions throughout the VISTA installations, such as Yes=1 & No=2, Yes=1 & No=0, etc. Organizing this diversity into a single representation will be essential in organizing the operational data for later research purposes. Data mining tools are best applied when a universal representation for Boolean columns, numeric columns and other structured columns. So reorganizing the HDR for future data mining efforts will require substantial restructuring and there is no tool available, prior to this application, which can provide highly productive ways of performing that reorganization.

VISTA uses the National Drug Code (NDC) to encode medications in unique ways. Nevertheless, Propranolol 10 Mg Tablets are recorded in the various VISTA installations using hundreds of distinct, unique NDC codes. This is a common practice in database technology which has to be corrected when multiple databases are integrated. Other examples include representing the nomenclature for medications, treatments, and many other issues that will have to be unified in the integrated HDR database. These linguistic obstacles to integration will be very expensive to overcome.

Presently, XML text data interchange among business partners is common practice, used widely in N-tier database systems with web services. Most large companies which use the internet for data exchange with partners have begun using XML descriptions. For example, title companies often send lenders an XML copy of a property's title as unstructured text columns within the XML message. The title description can indicate surveyors' comments about the property, its shape, size and other features which affect its value. Lenders and title companies require a method for checking the property description to ensure that it is consistent with other documents, such as appraisals, city or county records, and so on. A database representation that supports knowledge discovery of these title descriptions would provide consistent and low risk decisions about loan applications which reference this title.

In many enterprise architectures, in a wide variety of industries, XML interchange among business partners normally incorporates some columns with unstructured text, and there is at present no linguistic tool available that solves the issues of finding common methods of descriptions contained in these unstructured text columns. A tool is needed that can be applied to manage the context of unstructured columns by using the methods of corpus linguistics.

2. Description of Related Art

People use language within contexts. Yet the best present parser technology is based on context free grammars. There is at present no tool capable of organizing the many layers of context in which language carries meaning within application database contexts. Many context free methods have been developed for parsing language samples, but no effective, practical methods have been developed for relating context to language samples in a way that supports the necessary extraction of linguistic content based on application context. For example, noun phrases are commonly parsed so that the rightmost noun is chosen to be the "head" noun. Yet people use context to identify the head noun of a phrase, and it is often not the rightmost noun.

Corpus linguistics is a fairly recent subfield of linguistics developed to work with natural language texts. Corpora (also called "Corpuses") are collected as a body of texts, utterances, or other specimens considered representative of language usage. Corpora are available that have millions of words, and are annotated, or tagged, to add information about the meaning of the items in the corpus. Corpus analysis tools, including annotators, lexical resources, part of speech recognizers, parsers, conceptual graphs, semantic processors, logic interpreters and other linguistic tools have been developed to assist linguists in studying the ways in which language is actually used. Presently, most annotation is added by human observers. This practice is subject to the diversity of human opinion among a team of annotators, and with variable accuracy even using a single annotator. Simple annotations, such as part-of-speech labeling have been accomplished by automated functions, but no functions have been able to provide even modest linguistic competence at this task. There is a need for automated contextual information that has not been available to corpus linguists.

For example, the linguistic data consortium (LDC) is an organization at the University of Pennsylvania that has constructed a large body of corpora used in research, and made available to computational linguists for academic research or commercial application of corpus linguistics methods. Various annotations have been used to designate parts of speech, syntactic categories, pragmatics and discourse structures within the corpus. There is a need for methods that can provide contextual partitioning of linguistic entities so that corpus linguists can focus language processing functions into a narrower scope of understanding. Discourse analysis—the extraction of knowledge from lengthy text—is missing a context modeling capability that could organize the knowledge in each utterance and relate that knowledge to other utterances within the same discourse.

Tools have evolved due to the research and development focus on corpus linguistics. Extraction of vocabularies from texts, calculation of word and phrase histograms as used within texts, the separation of vocabularies for information retrieval used by Google, Yahoo, X1 and other search engines, and the application of lexical resources such as WordNet, SNOMED and others have expanded the corpus linguistics advances into commercial and consumer products and services. These tools have not been applied to the unstructured columns of databases because no method has been disclosed that can relate each portion of the text to knowledge extraction of other portions. Text has been treated as a homogenous collection of lexical, syntactic and semantic atoms, not as an organized, context sensitive discourse about related subjects. As a result, the costs of knowledge extraction from databases are vastly more expensive than the benefits due to lack of an effective method.

Present corpus linguistics technology is focused on the most general usage of language without context of enterprises and situations that are highly specialized. There is no widely agreed upon method for representing changing context within a corpus. In database applications, the structured columns provide context only within query statements, and a flexibly controlled context is not available to corpus linguists at present. Corpus linguistics technologies are also not presently focused on exploiting the context of a situation to assist in understanding linguistic constructions. At present there has been no disclosure of methods that can apply the methods of corpus linguistics in the contexts of databases.

Database data models are sometimes referred to as ontologies, although ontologies have constraints and inferential rules in addition to entity relationships. An ontology is one way of structuring conceptual models into classes, objects and relationships among the objects. An upper level ontology of concepts has been suggested among the community of philosophers, logicians and software engineers as an initial ontology for applications. The IEEE Standard Upper Ontology (SUO) working group applied some of the world's best logicians, philosophers and linguists to the problem of choosing at least a small "universal" ontology based on a conceptual framework. This is one approach to narrowing context, but is not specifically linguistically based. Ontologies are presently being studied in many areas, but have not made much commercial progress, perhaps with Cyc as the most well known example. And even after years of searching, the SUO group was unable to agree on a suitable top level ontology. One conclusion many SUO members reached was that no universal ontology exists because the meaning of classes, objects and relationships constitute subjective experiences on the part of the sending and receiving agents, and do not represent abstract properties of reality.

This is certainly the case in present day applications of database technologies. Each database represents a very large number of situations recorded in highly structured ways, but with unstructured text information embedded into the database as well. Ontologies as actually used by people are empirically developed through individual experience, rather than abstractions describing reality in some objective way. Database applications represent specific shared experiences that have been recorded by people and functions, and hence are as empirical as a corpus, but with surrounding context added. There is a need for methods of linguistic classification, theorization, validation and interchange among ontologies which can represent empirical database ontologies in a form that can be used to analyze unstructured text columns in the databases.

At present, linguists assign a limited number—about twenty—of themes or roles to phrases and use corpus linguistics methods to manage some degree of linguistic competence. These limited roles and themes are known to linguists and recognized as methods for representing knowledge about linguistics. But this very limited number of roles and themes confines linguistic analysis, and is insufficient for the much larger numbers of object classes that represent empirical databases. What is needed for linguists to make substantial progress is a greater degree of contextual focus, through an unlimited set of objects, themes and roles organized in a way that represents a linguistic construction within a context. There is a need for representing themes and roles in a deep unlimited context so that alternative solutions can be deeply focused on the situations that linguistic expressions describe. There is a need for an open-ended set of concepts that can represent the themes and roles, and therefore expand contextual knowledge.

There is a strong need for the integration of database technology and linguistic methods, both to extract linguistic knowledge in databases, and to support computational linguists in extracting context and then knowledge from unstructured texts. This invention discloses a method that is applicable both to the computational linguist and to the database engineer.

SUMMARY OF THE INVENTION

The present invention overcomes these and other deficiencies of the prior art by providing a method for organizing database information in a form that can be analyzed and exploited for obtaining further knowledge by the use of corpus linguistics techniques.

In this application, the word "column" is not limited to, but is intended to refer to a specific column within a specific table, view, or query in a database. Views and queries are used to construct an object with its various master and detail views; each of the columns in an object can be traced to at least one table, view or query in the partition where the column occurs.

The word "database" is not limited to, but is intended to be used in this application to refer to a set of tables, columns, domains and constraints that encompass a single context. Embodiments of the database concept as it is used here include an SQL database, a relational database, a network database, or any subset of a database. For clarity of disclosure, the term database as used in this application can refer to any of these embodiments, even if the embodiment is not necessarily an individual database. For example, in FIG. 5, a number of databases are shown, one database per node. The term database is used to make clear how the context of a node is limited to a subset of the node above it, but the term database actually can refer to any embodiment selected to contain the subset of data.

The word "phrase" is used herein to refer to a linguistic text or utterance. Examples of phrases include single words, statements, noun phrases, collocated word sequences, verb phrases, adverbial phrases, adjectival phrases, sentences and paragraphs. Any linguistic statement is a kind of phrase as used in this application.

The phrase "corpus linguistics" and its equivalent "corpus analysis" is used herein to include, among others, corpora, annotators, lexical resources, part of speech recognizers, parsers, contexts, conceptual graphs, semantic representations, logic interpretations, and other linguistic tools and objects employed by linguists to analyze linguistic texts and utterances.

The invention describes a method for;
iteratively or recursively partitioning a database into cases using structured and unstructured columns;
defining some of the cases as databases; and for
assigning a machine readable context description to the partitions.

With this invention, an ontology can be developed empirically from a database which reflects the perceptions of observers who authored the data. With this invention, linguistic interfaces can be developed that interact directly with human operators. Software with linguistic competence can provide a greater level of understanding for existing databases. Linguistically competent software can assist in validating data at its point of entry by providing greater feedback to the person entering the data. Quality assurance can be provided by software that understands the tasks which a human operator performs. Software capabilities are needed for incrementally adding knowledge in the form of new structured and unstructured columns to the database, as well as new rows, tables and domains. This invention can provide a component for embodiments in databases, question answering, discourse analysis, speech recognition, speech understanding, interactive robots, interactive appliances, and many other useful embodiments as devices and software applications that require a high level of linguistic competence.

The invention applies corpus analysis and information retrieval methods to organize the structured and unstructured columns within each partition into individual cases. By defining some of the partitions as databases, the method can create a graph of partitions showing the successively narrowed contextual focus of each database node. As the partition graph grows, further and further constraints are placed on each tip node until knowledge can be directly inferred from the tip node database columns and the context descriptions.

The invention here supports the incremental addition, deletion or updating of databases, tables, columns, domains and constraints. Some of these new objects can be generated by analyzing the linguistic patterns of structured and unstructured columns. The method can incrementally add knowledge to the database by means of corpus linguistic analysis of cases, as well as by discovering new constraints about the way data is stored in the various partitioned cases.

This invention describes a method for applying and focusing the contents of a database into increasingly narrow contexts where the methods of corpus linguistics can be applied to unstructured text columns and structured text columns alike. This invention provides a method for organizing corpora of texts so that deep levels of context can be used to separate the texts into conceptually equivalent sets within databases. This invention provides a way to iteratively apply corpus linguistics technologies to databases and to apply database technology to corpora of texts.

This invention can provide a component for embodiments in databases, question answering, discourse analysis, speech recognition, speech understanding, interactive robots, interactive appliances, and many other useful embodiments as devices and software applications that require a high level of linguistic competence.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 2 is an embodiment description of three basic types of tables within a typical metadata database.

FIG. 3 describes a simple way of representing extensible constraints on the tables, columns and domains of a database.

FIG. 11B describes how the Elk embodiment uses first order logic expressed as English phrases, with variables, functions, objects and relationships; graphical displays may be embodiments of structured columns, and these can be organized into embodiments or application programs as well.

FIG. 14 shows how the model of scientific discovery can be specialized for specific activities using the partitioning and corpus analysis method disclosed herein.

FIG. 22 describes an embodiment for initial measures of effectiveness for managing the theorizing process; application dependent efficient embodiments of measures of effectiveness can be added or substituted to these initial ones as empirical knowledge is gleaned from the database.

FIG. 23 describes an embodiment for cost and progress measures that can be used to evaluate the overall effectiveness of the four processes, their interfaces, and their individual measures; application dependent efficient embodiments of measures of cost and progress can be added or substituted to these initial ones after empirical knowledge has been gained with the database.

FIG. 24 shows an application implementation plan embodiment for managing the overall process of database knowledge discovery showing good management practice for project management and engineers to control the cost and effectiveness of the application.

DETAILED DESCRIPTION OF EMBODIMENTS

Figure 1:
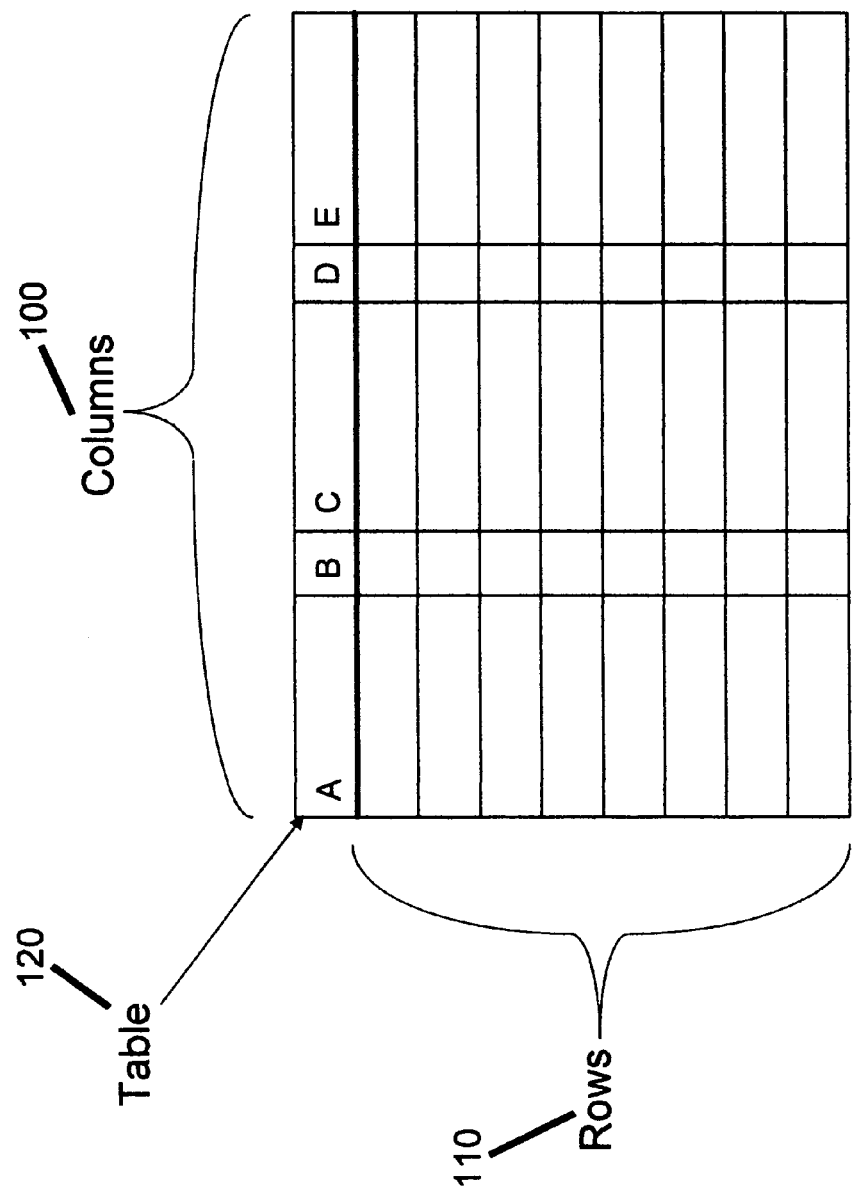
FIG. 1 is a conceptual description of a table within a database. This figure graphically defines the notions of tables, columns and rows.

Further features and advantages of the invention, as well as the structure and operation of various embodiments of the invention, are described in detail below with reference to the accompanying FIGS. 1–24, wherein like reference numerals refer to like elements. The embodiments of the invention are described in the context of medical records applications. Nonetheless, one of ordinary skill in the art readily recognizes that many applications can benefit from the method disclosed herein. These include, but are not limited to, the following:

a medical records database;
a work flow database;
a quality assurance database;
a database containing both structured and unstructured columns;
information retrieval;
question answering systems;
language capable interactive robots;
language capable interactive appliances;
language capable interactive vehicles;
linguistically competent speech recognition;
speech understanding;
corpus linguistics; and
interactive entertainment.

More generally, the embodiments of this invention include the application of corpus linguistics technologies to databases, and the application of database technologies to corpus linguistics analysis, through a novel method of organizing database contexts and focusing linguistic contexts.

FIG. 1 is a description of a conceptual table within a database. A database has an unlimited number of tables, and tables can be created, deleted, or updated within the database. All tables have a set of named columns and a set of unnamed rows, where each row can have a value for each domain assigned to each column. In FIG. 1, there are five columns 100 named A, B, C, D, and E. There are eight rows 110 in the table 120 in FIG. 1.

Naming conventions are important in database applications because the database designers have to understand the functions associated with each name. For this reason, database name conventions are usually managed in a meaningful way.

Each table 120 in a database has a name that is distinct from all other table names, but the table name may, in some database systems, have the same lexical name as a column or a domain name.

Column names are distinct within a given table, but the same column name can be used in an unlimited number of tables. Column names may be lexically indistinguishable from either domain names or table names, but are distinct within each single table.

Database names are distinct within a database domain that refers to other databases. Database names can be lexically distinct, or they can be described by paths from a root database using dot (".") notation, such as Root.Medical.Verbs.Locatives, which could be populated by phrases used to designate locations.

All of these names are symbolic, and have functional associations in a database management system's metadata. In one embodiment, names are stored as strings. In another embodiment, names can be associated in a dictionary, and the index to each name can be stored in the metadata in place of the strings.

By adding new rows into the Tables table 200, new tables can be created and named after meaningful concepts. By adding new rows into the Columns table 220, columns can be created and named for any table, whether newly created or even added to preexisting tables. By adding new rows to the Domains table 210, additional domain representations can be defined, and new software drivers for new domains can be added by programmers to the structure of the database application.

FIG. 2 is a description of three basic tables within a metadata database embodiment. Many relational databases have some form of metadata that is accessible to queries, for changing the database structure, and for retrieving information about a database embodiment. Other relational databases maintain metadata in a separate storage area from operational data, and do not offer to the user queries, updates or information retrieval about metadata. Either of these is an acceptable embodiment for some selected applications.

The metadata in commercial database products is often specifically designed for each product. Some products do not provide access to the metadata in tabular form. Few products use the naming conventions of FIG. 2, but they are named in this embodiment in a way that helps disclose the functions of a metadata design.

In this embodiment, all tables in a database are stored in a table named "Tables" 200. Only the column "Table_Name" 201 appears in this embodiment. There are six initial rows in Tables, naming the six initial tables in this database design embodiment.

All domains in this embodiment are stored in the table named "Domains", and the rows of Domains indicate the built-in representations that the system programs use to implement domain storage and functionality. This embodiment supports Database 211, Domain 212, Column 213 and Table 214 as values in the Domains table 210. By adding new rows to the Domains table, and providing interpretive functions associated with each new row, programmers or product developers can implement an arbitrary number of domains.

All columns in this embodiment are stored in the table named "Columns" 220, which has three columns named "Table" 221, "Column" 222 and "Domain" 223. There are thirteen initial rows in Columns, identifying the initial table designs for the metadata database. Additional columns can be defined, one per row, and added to the Columns table.

Other database systems have various ways of representing databases, domains, columns and tables. For the purpose of disclosure, this embodiment is used to make explicit the way in which databases, domains, columns and tables are interrelated in the metadata database.

FIG. 3 describes a way of representing constraints on the tables, columns and domains of a database. By using visible metadata in the figure, disclosure of the invention is made graphic. Embodiments that do not make metadata visible to the query language programmer are also acceptable. Normally skilled software engineers can write data interpreters using programming languages in addition to the query language embodiment disclosures in this application to effect the necessary functions. This embodiment uses three additional tables already mentioned in FIG. 2. These tables include "Constraints" 300, "Primary_Key" 310 and "Foreign_Key" 320 constraints. Additional constraint types can be defined in any meaningful way. Interpretation and enforcement of constraints are implemented in the embodiment. In some embodiments, the query language is the somewhat standardized structured query language (SQL) which supports triggers, stored procedures, constraint specifications, and other methods for interpreting and enforcing constraints. In other embodiments, the constraints are enforced in a programming language (Delphi, C++, Visual Basic, Java, etc).

The only initial rows in the example Constraints embodiment are shown as "Primary_Key" and "Foreign_Key". These indicate the ways in which columns are used within tables. Interpretation and enforcement of these constraints is built into some SQL implementations. It can also be built into programming language implementations, either with or without SQL support, such as Delphi, C++, Visual Basic, Java, etc.

A Primary_Key 301 constraint means that each row in a table contains distinct values in the combined set of columns which are collectively labeled as Primary_Key 301 columns for that table. Each row has a distinct value in this set of columns from that of all other rows. The primary key for Tables 200, 312 is one column: Table_Name 311, 201. Similarly, the primary key for Domains 210, 313 is the Domain_Name 314, 215 column. For Columns 220, 315, there is a set of two columns, named Table 316, 221 and Column 317, 222. Note that each constraint in the Primary_Keys 310, 202 table has a unique name, since Name 310 is the primary key column for Primary_Keys 310. Foreign_Keys 320 also has a Name 321 primary key constraint.

A Foreign_Key 302 constraint is placed on a column in a table. The Foreign_Key 302 constraint means that the column in that table has a value that can be found among the rows of the specified column in another table. For example, the Domains 210 table contains rows of allowable domain types. In FIG. 2, all rows in the Columns 220 table, Domain column 223, are of type String. All columns in the metadata database are of type string. Therefore all columns in the metadata database named "Domain" 223 satisfy the Foreign_Key constraint shown in row 2 of the Foreign_Keys table 320.

Figure 4:
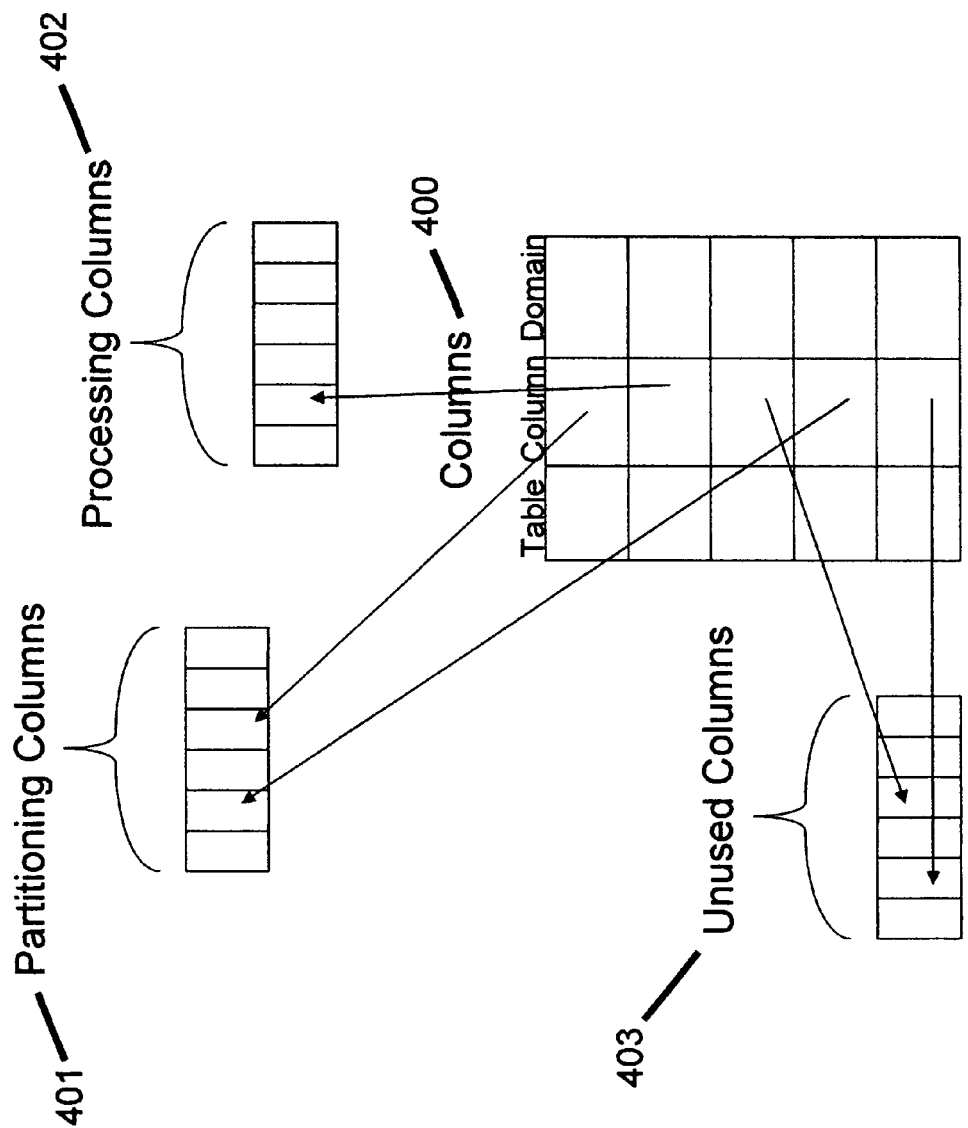
FIG. 4 describes how the "Columns" table can be organized into three groups for each partitioning operation in the graph of partitions, comprising partitioning columns, processing columns, and unused columns.

FIG. 4 describes how rows of the "Columns" table 220, 400 can be organized into three groups in an embodiment. A selected subset of zero or more rows, indicating database columns, can be used for each partitioning operation. These columns are called partitioning columns 401. Another selected subset of zero or more rows, indicating database columns, can be used for processing. These columns are called processing columns 402. The set of processing columns 402 is possibly overlapping with the set of partitioning columns 401. The remaining subset of zero or more rows can be defined as columns that will not be used in partitioning and will not be processed. These are called unused columns 403. In a medical records database embodiment, the diagnosis code can be useful in identifying possible treatment plans. By partitioning the database columns on the basis of diagnosis code, each set of rows with the same diagnosis code, or a related diagnosis code, can be gathered into a smaller set of views or tables for further investigating the unstructured text columns associated with the diagnosis codes. This set of views or tables can be structured into a new database distinctly named using the value of the diagnosis, plus whatever additional prefix or suffix is necessary to make the database name unique. In this example, the name "Diagnosis_Asthma" will be used to distinguish the new database.

In an embodiment, the new Diagnosis_Asthma database will then contain a complete set of metadata tables, plus the tables and views associated with the objects and activities represented in the Diagnosis_Asthma partition. This partitioning approach can then be iterated by further partitioning the Diagnosis_Asthma database into a further set of partitions. Eventually, after partitioning has been iterated sufficiently, partitions result that are empty of information, or that have only one row in specified processing columns 402. No further partitioning can be applied until new information is created to add rows to this partition.

Figure 5:
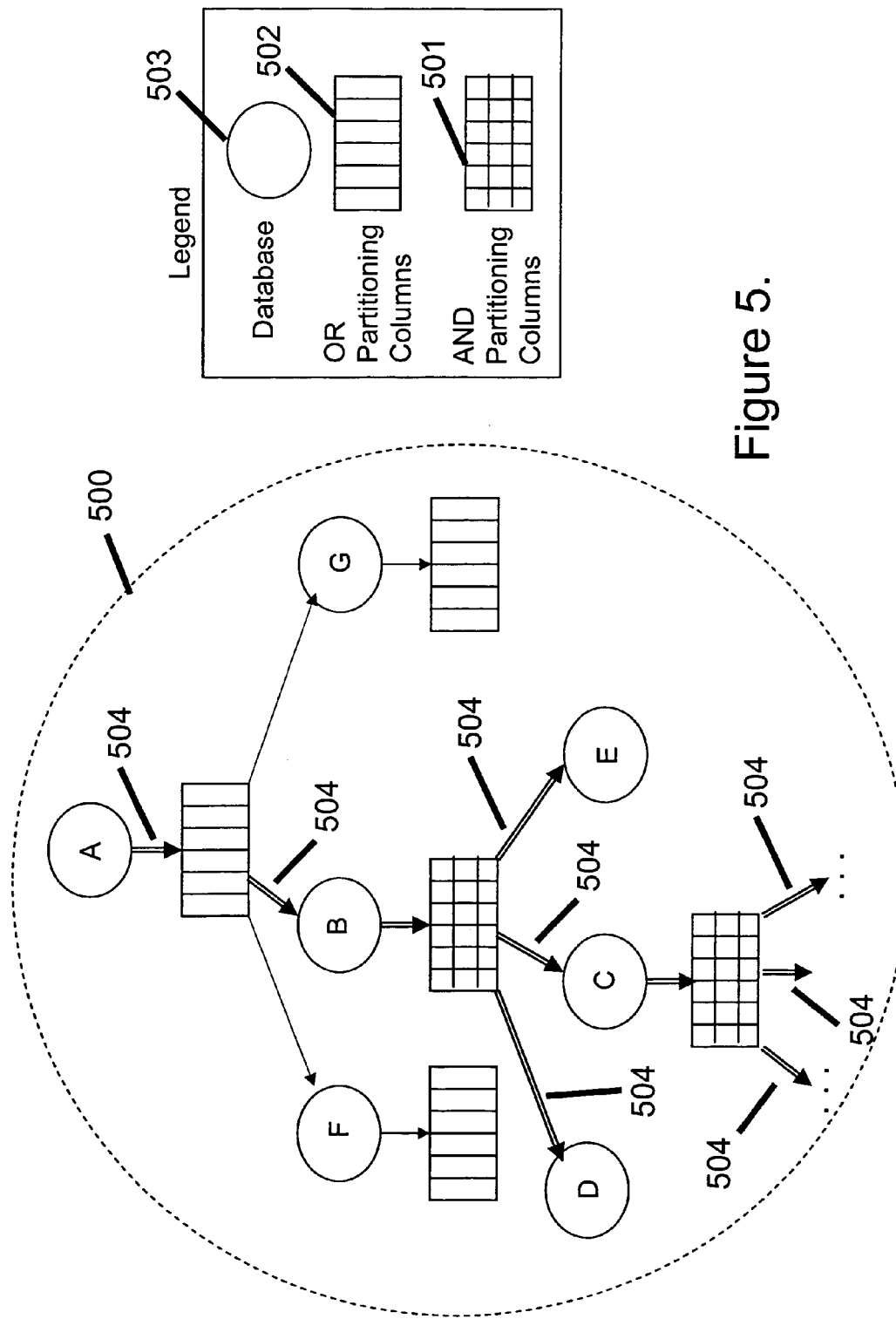
FIG. 5 shows a conceptual graph of partitions, and identifies two types of partition cases: AND and OR; AND/OR search is a well known problem reduction method in artificial intelligence, and normally skilled engineers are familiar with the concept.

FIG. 5 shows a conceptual graph of partitions 500, and identifies two types of partitions: AND 501 and OR 502. Each partition can be defined as a database if there are multiple rows of a specified processing column in that partition. In an embodiment, database A is separated into three partitions as shown in the figure.

AND/OR search produces a solution subtree among the search nodes. The solution subtree 504 is marked with double lines, while links that are not part of the solution subtree are shown as single lines. As is well known by engineers, an AND/OR graph can be searched for the most appropriate node to expand next. In this embodiment, the nodes are databases, and expansion of a node is equivalent to partitioning of a database. Later in this specification, measures of effectiveness are proposed that are representative of the ways in which progress can be estimated, and measures can be assigned to each database 503 node. Engineers normally versed in the art will realize that any measure can be used which provides an appropriate heuristic estimate for accomplishing the goals through the use of a partitioning function. Engineers should understand the process of solvability labeling, which is used in AND/OR search to choose the solution subtree 504 with the highest heuristic value estimate, or the lowest cost estimate, or an appropriate combination of highest value and lowest cost.

Database B results from an OR partitioning of database A. For this embodiment graph, engineers have determined that an AND partition of B is appropriate, and the partitioning is shown just below B on the figure. Since B is AND partitioned, all partitions C, D and E are marked as part of the solution subtree. Each of these partition nodes is determined to be solved if B is to be labeled solved. If any partition node is determined to be unsolvable, then database node B is also labeled unsolvable, and the unsolvability labeling process propagates up the solution subtree to the parent database node.

In the embodiment figure, Database C is chosen to generate an AND partition, in which failure of any one of the links below C signals failure of the solution subtree rooted at C. Equivalently, if D or E are expanded and found to be unsolvable, then C, D or E can propagate the unsolvability label upward to AND node B, which will propagate further to A, and ultimately search will progress along the F or G direction.

When a partition contains zero members, it is called a singularity. Partitions that contain a single member are called atomic cases. Partitions that contain a plurality of members can be designated to be databases. Singularities indicate that no knowledge is available of cases that map into that partition's contextual case. Atomic cases represent the only known data, word or phrase used so far used in a specific contextual case. Databases are indications that the descriptions of the corresponding partitioned contextual cases are varied, perhaps justifying further investigation and subsequent partitioning, or perhaps suggesting that the partitioning method which generated the database can be further refined.

Singularities cannot be further partitioned because they contain no data. Atomic cases cannot be further partitioned because they have only one conceptual instance. In an embodiment, given a partitioning method, for those partition cases that contain databases, the method disclosed herein can be applied recursively or iteratively. Engineers, or functions, can determine which databases should be further partitioned. Those selected databases can be partitioned according to a set of processing columns, partitioning columns and unused columns for each partitioning. For singularities, atomic cases or databases, engineers or functions can assign a meaningful concept to each case. In one embodiment, concepts include classifications 1300B, observations 1300C, theories 1300D, or experiments 1300A. Each of these conceptual structures is further discussed later in this invention. In other embodiments, other methods of assigning meaningful concepts to each case can be domain dependent.

Figure 6:
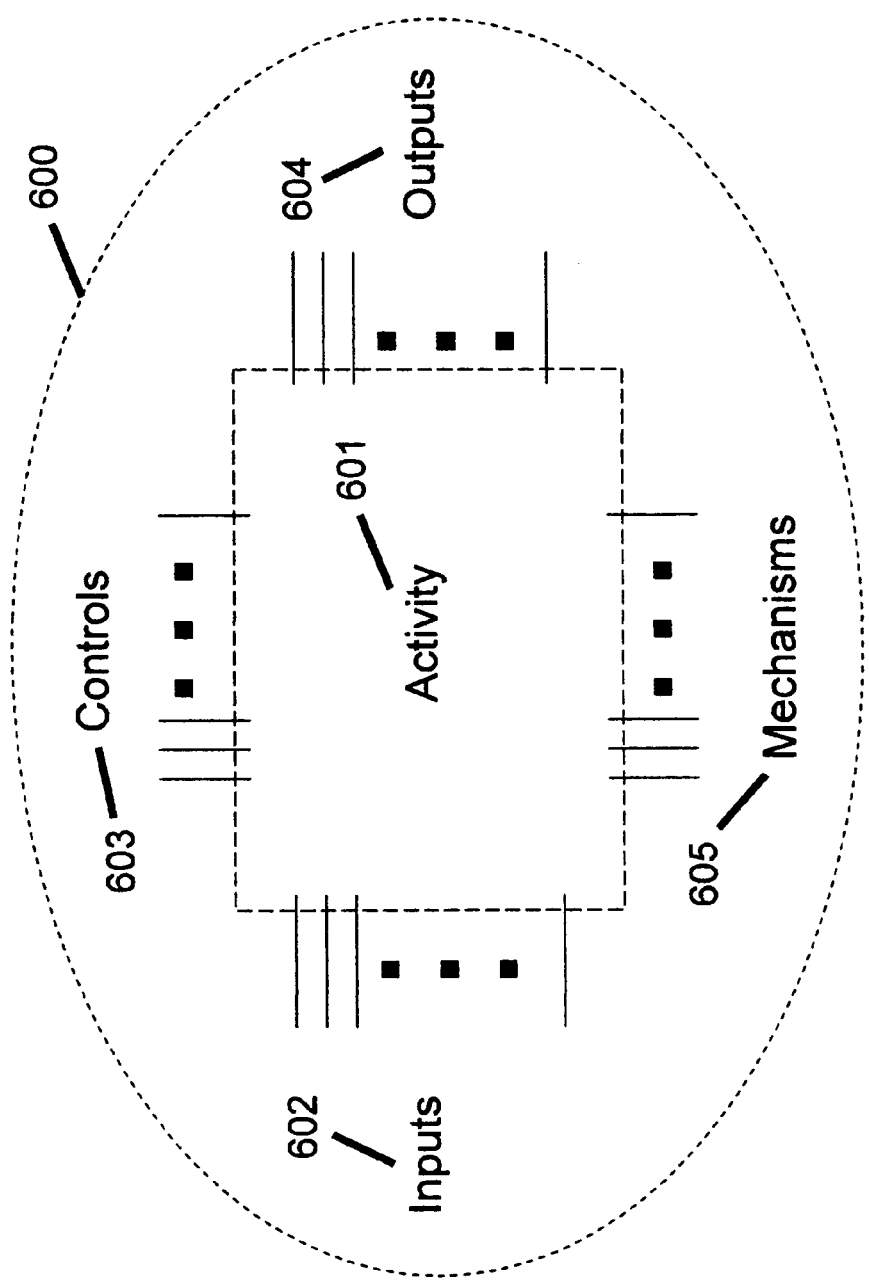
FIG. 6 illustrates the IDEF0 conceptual representation embodiment for activities and objects which are described in structured and unstructured columns. Other methods of representing activities and actions are also embodiments of the conceptual representation.

FIG. 6 illustrates an IDEF0 conceptual representation for activities and objects which are described in structured and unstructured columns. IDEF0 is a public domain standard representation that is familiar to many business entrepreneurs, industrial engineers, software engineers, and others concerned with modeling business processes. There are many other methods for modeling business processes, but IDEF0 is disclosed in this embodiment for its wide familiarity among practitioners of the art. A practitioner familiar with the art could choose other representations for other reasons, but this invention is not restricted to IDEF0; it could be used with any representation of activities or actions.

One embodiment uses an extended form of IDEF0 where each activity context diagram can be associated with a plurality of decomposition diagrams. In the standard IDEF0, each context diagram has a single decomposition diagram. The extension disclosed here, in another embodiment, is added for the purpose of representing a diversity of ways in which a context diagram can be matched through AND/OR search techniques to one or more decomposition diagrams that might have been used, as will be determined during the search.

Computational linguists have used themes and roles to discuss fine points of linguistics among themselves. In an embodiment, these roles can be formulated as IDEF0 object classes. Many verbs can be modeled as IDEF0 activities, and complete situations can be modeled by a decomposition or a nested structure of decompositions. In an embodiment, typical linguistic roles and themes include, but are not limited to, the following:

Agent—the cause of an activity, can be modeled as a mechanism or control subtype;

Experiencer—the object that experiences the action can be a mechanism or control subtype;

Force—the natural forces such as gravity, thrust, torque . . . can be modeled as control or mechanism subtypes;

Theme—a commonly experienced scene or structure of objects can be modeled as an activity decomposition with supporting objects;

Result—a product of an activity can be modeled as an output subtype or by a decomposition when the result is a new situation or configuration of objects;

Instrument—a device or object which is used to accomplish an activity can be modeled by a mechanism or control subtype;

Beneficiary—the agent that benefits from an activity can be modeled by an object of any agent subtype; and Goal—the situation desired by a purposive agent can be modeled by an activity decomposition subtype.

Certain verb phrases, such as 'is a', 'is part of', 'is a kind of', and similar phrases are commonly used to signify type-instance, part-whole, and type-subtype relationships. In an embodiment, the classes of objects can be modeled as types of icom objects specified by IDEF0 modelers. In an embodiment, linguistic collocations, selectional associations, and selectional restrictions can be modeled using the IDEF0 classification methods.

In an embodiment, first order logical facts and rules can be used to encode events, situations, properties of objects, and relationships among objects. Each database node can have the capabilities of first order logic, and a first order logic question answering tool can be part of an embodiment. First order logic can be used to assist the engineer or automated functions in developing partitioning methods to divide a database node into partitions based on a first order logic expression.

In IDEF0 terminology, as used in an embodiment, everything is an object. One class of objects is the activity class. In FIG. 6, an activity 601 is shown in its context diagram 600. Typically, a context diagram 600 represents a specific activity 601 that consumes inputs 602, is guided, authorized or specified by controls 603, produces outputs 604, and is performed through the use of mechanisms 605, as shown in FIG. 6. The activity 601 is represented in this embodiment as a dashed box with a phrase that describes the activity.

Figure 7:
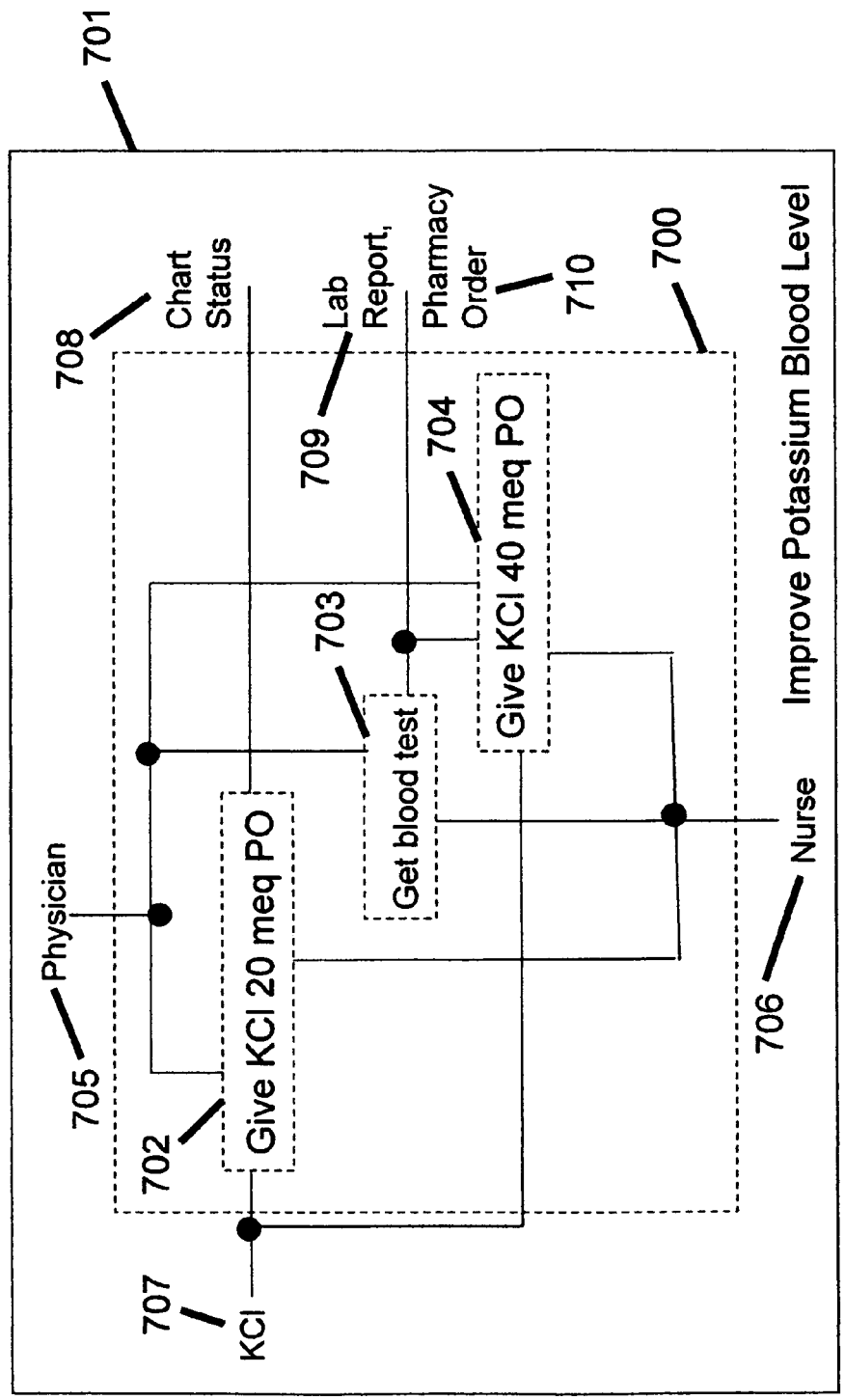
FIG. 7 shows an embodiment of activity and object representation in the form of an IDEF0 decomposition of the activity "improve potassium blood level" into three lower level activities and their associated objects and agents.

FIG. 7 shows an embodiment IDEF0 decomposition diagram of the activity "improve potassium blood level" 700 into three lower level activities and their associated objects and agents. The decomposition diagram can identify how the lower level activities 702, 703, 704 are interconnected, illustrating how they share access and production of objects. Objects in FIG. 7 include a physician 705, a nurse 706, a medication called KCl 707, a chart status 708, a lab report 709, and a pharmacy order 710. The physician 705 is a control 603 object because she writes the prescription that authorizes the actions "Give KCl 20 meq PO" 702, "Get blood test" 703, and "Give KCl 40 meq PO" 704. The nurse 706 is a mechanism 605 object because he performs the three activities. KCl 707 is an input 602 because it is consumed in the activities "Give KCl 20 meq PO" 703 and "Give KCl 40 meq PO" 704.

In the formal model for IDEF0, there is at most one decomposition of an activity. Primitive activities are not given decomposition diagrams for their context diagrams because no additional model is required for the purposes of the modelers. In this embodiment, and as used throughout this application, there can be any number of decompositions for any activity. This extension to the standard IDEF0 conventions allows alternative decompositions of activities to be used in interpreting database contents. The method for choosing among alternative decompositions will be explained later in this invention in FIGS. 9, 10 and 11.

Figure 8:
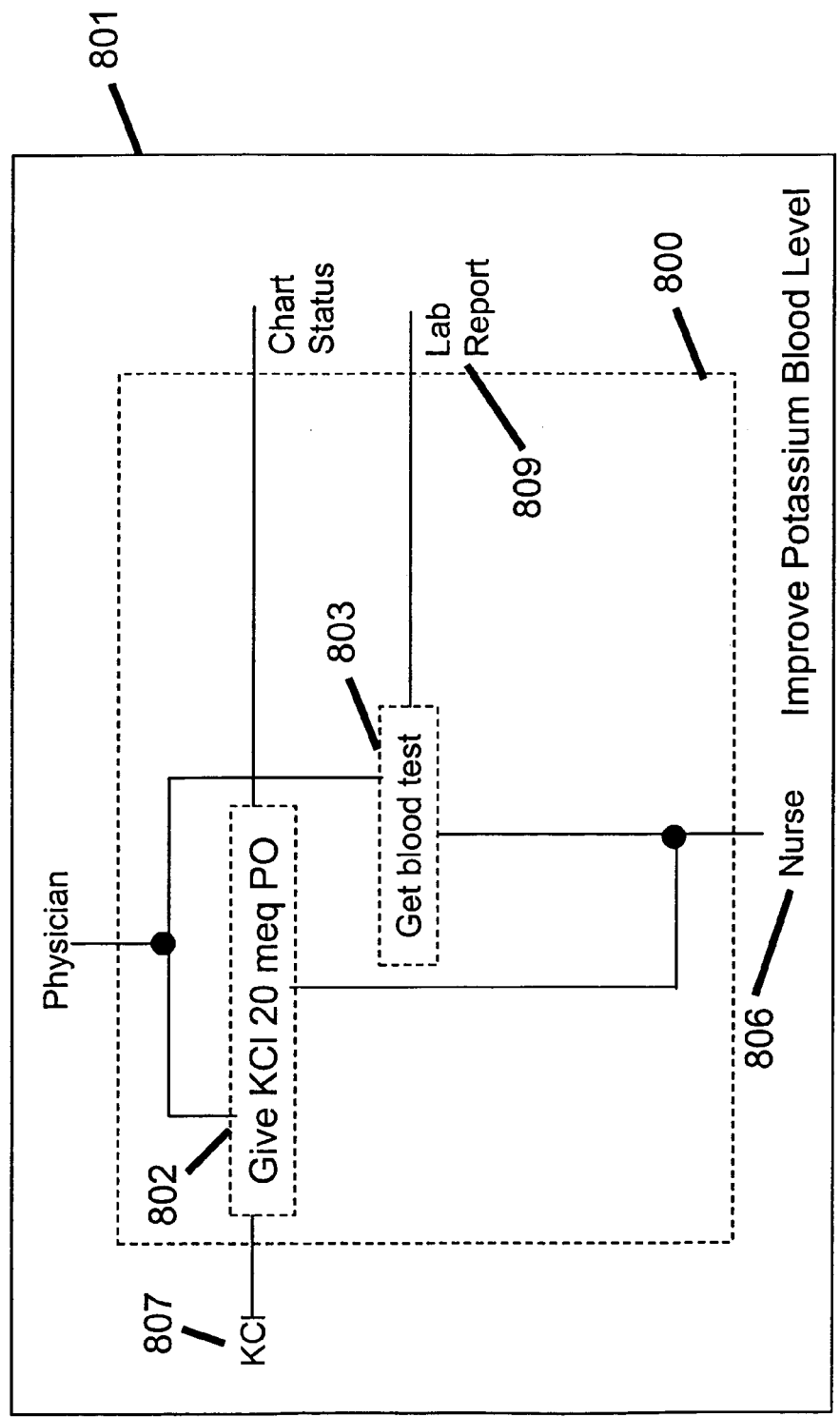
FIG. 8 shows a different embodiment of activity and object representation. This second embodiment is an IDEF0 decomposition of the same "improve potassium blood level" activity in a different context.

FIG. 8 shows a different embodiment IDEF0 decomposition diagram 801 of the same "improve potassium blood level" 800 activity 703. In FIG. 7, the nurse 706 performs the three activities "Give KCl 20 meq PO" 702, "Get blood test" 703, and "Give KCl 40 meq PO" 704, which are lower level activities than the "improve potassium blood level" 700 activity. In FIG. 8, the nurse 806 performs only two activities "Give KCl 20 meq PO" 802 and "Get blood test" 803, but because the lab report 809 indicates a normal level of potassium, he does not produce a new pharmacy order 710 for more KCl 807, and does not perform the activity "Give KCl 40 meq PO" 704.

The decompositions in FIGS. 7 and 8 differ by the outcome of the blood test, performance of the third activity, and the pharmacy order. In an embodiment, all of these objects and activities are mentioned in the medical record database. Some are described in structured columns, while others are described in text columns. In an embodiment, the hospital's goals include ensuring treatment delivery quality, and ensuring that all products and services have been billed to the payor. To meet these goals, the hospital database records which of these two decompositions 701, 801 was actually performed. So the original physician's order, and the outputs of the activity "improve potassium blood level" 700, 800 is consistent in all these objects as interpreted in the medical records database.

During a typical hospital stay, estimates have been made that the probability of getting the wrong medication, or getting insufficient medication, can be as high as 30%. There are a number of ways in which these error cases can be identified. In an embodiment, various alternative decompositions which can detect an error can be included in the database of decompositions 1000. When a medical record is shown to meet all the conditions of an error activity, this error can be brought to the attention of the physician, the nurse, the hospital quality assurance staff, accounting staff, or other relevant staff for corrective actions.

In other embodiments, other enterprises or applications have equivalent needs for recognizing error actions and conditions. These can be modeled using the same extended IDEF0 activity models with objects that are representations of the actions, products, services, supplies and staff of that enterprise. An engineer of normal skilled in the art will know how to develop models of the enterprise objects of interest, and how to relate them through the extended IDEF0 activity model disclosed here.

Figure 9:
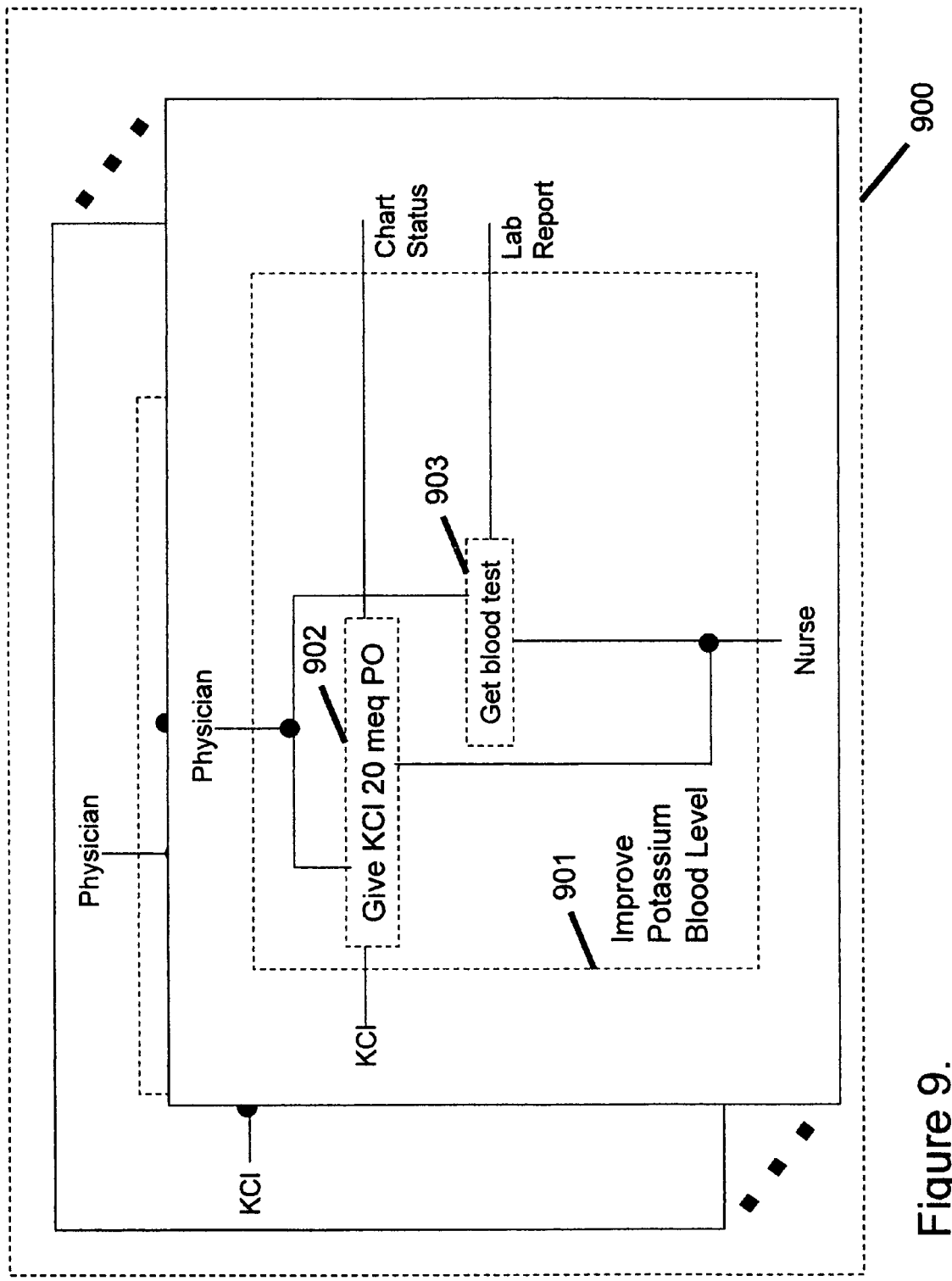
FIG. 9 describes a conceptual catalog of embodiment decompositions for the "improve potassium blood level" activity, each to be postulated as a different explanation for database descriptions.

FIG. 9 describes an embodiment containing a conceptual catalog of decompositions 900 for the "improve potassium blood level" 901 activity, each to be postulated as a different explanation for database descriptions. The items in this catalog are in an OR relationship with the activity context "improve potassium blood level" 700, 800. Thus any one of these activity decompositions 700, 800 could explain the contents of the database when treatment has been fully performed. In this example, both decompositions 701, 801 might be in the graph of partitions when the first activity "Give 20 meq PO" 902 has been completed, but neither of the other two activities has been completed. So both of these decompositions 701, 801 bear an OR relationship to a database above them in the partition graph up until the second activity "Get blood test" 903 has been completed.

In an embodiment, a decomposition can be said to explain a database if every object in the decomposition matches some object in the database. During the design of activity models, it is important to be able to distinguish the various decompositions from each other in terms of the objects that they match, including constraints on the values or value ranges of each object. This process of designing databases and their matching methods is an art which database designers and engineers can be expected to know. In an embodiment, this process allows for objects to have column values in nonoverlapping ranges at least for one or more columns if two decompositions are to have the same set of objects. Where a decomposition A has the same objects as another decomposition B, yet A also has an additional object, matching may become a process of ensuring that only one of A or B makes a full match with database contents in some other way, such as structured columns containing lab report range constraints in an embodiment.

Figure 10:
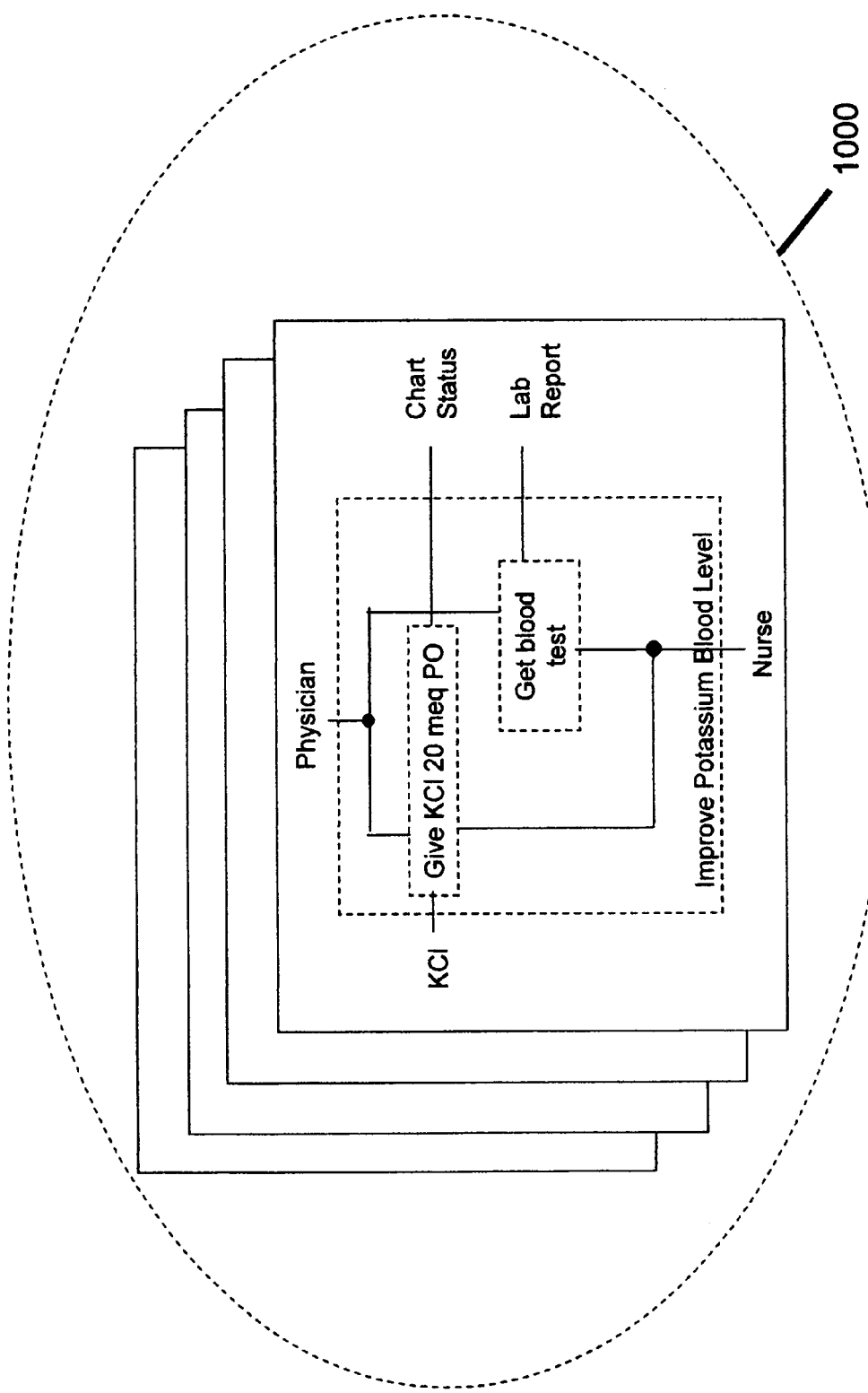
FIG. 10 is an embodiment of a global conceptual catalog of decompositions for many activities in which activities of an enterprise, question answering system, medical record database, interactive appliance, robot, or other embodiment application can have a plurality of possible decompositions.

FIG. 10 is an embodiment of a conceptual global catalog of decompositions 1000 for many activities. Depending on the nature of the database being analyzed, the activities and their decompositions will be simultaneously considered as they are performed. In a hospital embodiment, for a single patient, there can be one activity 503 which is the root of all other activities in the partition graph 500. The global catalog triggers the AND/OR search for activities at specific points in the enterprise's process flow. The purpose of FIG. 10 is to disclose that a plurality of activities can be modeled wherein each activity has an associated plurality of decompositions. The linguistic text and structured columns in the database can be used to identify which of these decompositions is most appropriately reflected in the database rows.

In some robot embodiments, the root activity can be named "survive". This activity is modeled by decompositions that relate to maintaining its active readiness, managing the state of resources and mechanisms assigned to the robot, and activities that define the useful actions the robot can take to meet the goals of its owners.

In an enterprise embodiment, a root activity might be named "fill purchase order". This activity might be decomposed depending on the line items listed in the purchase order, resulting in a plurality of work orders. Each line item might be produced by the activity "fill work order". Depending on the objects of interest to the enterprise, models might include the resources, mechanisms, agents, supplies, assemblies, products, shop floor areas, and other objects described in IDEF0 models of the enterprise's work flow.

In a speech recognition embodiment, a root activity might be "understand". The context of a task to be understood can be modeled with the extended IDEF0 methods disclosed here. By tracking the conformance of a potential utterance interpretation, the added context can help reduce the number of possible interpretations that a speech recognizer manages as it processes the utterance. Speech recognition methods often employ hidden Markov Models (HMMs) to join sound fragments into recognized phones and words. By integrating speech recognition HMMs with linguistic methods to include feedback from higher level linguistic interpretations, a larger knowledge base can be used to train the HMMs, and to provide linguistically competent recognition, through context representation and control.

Figure 11A:
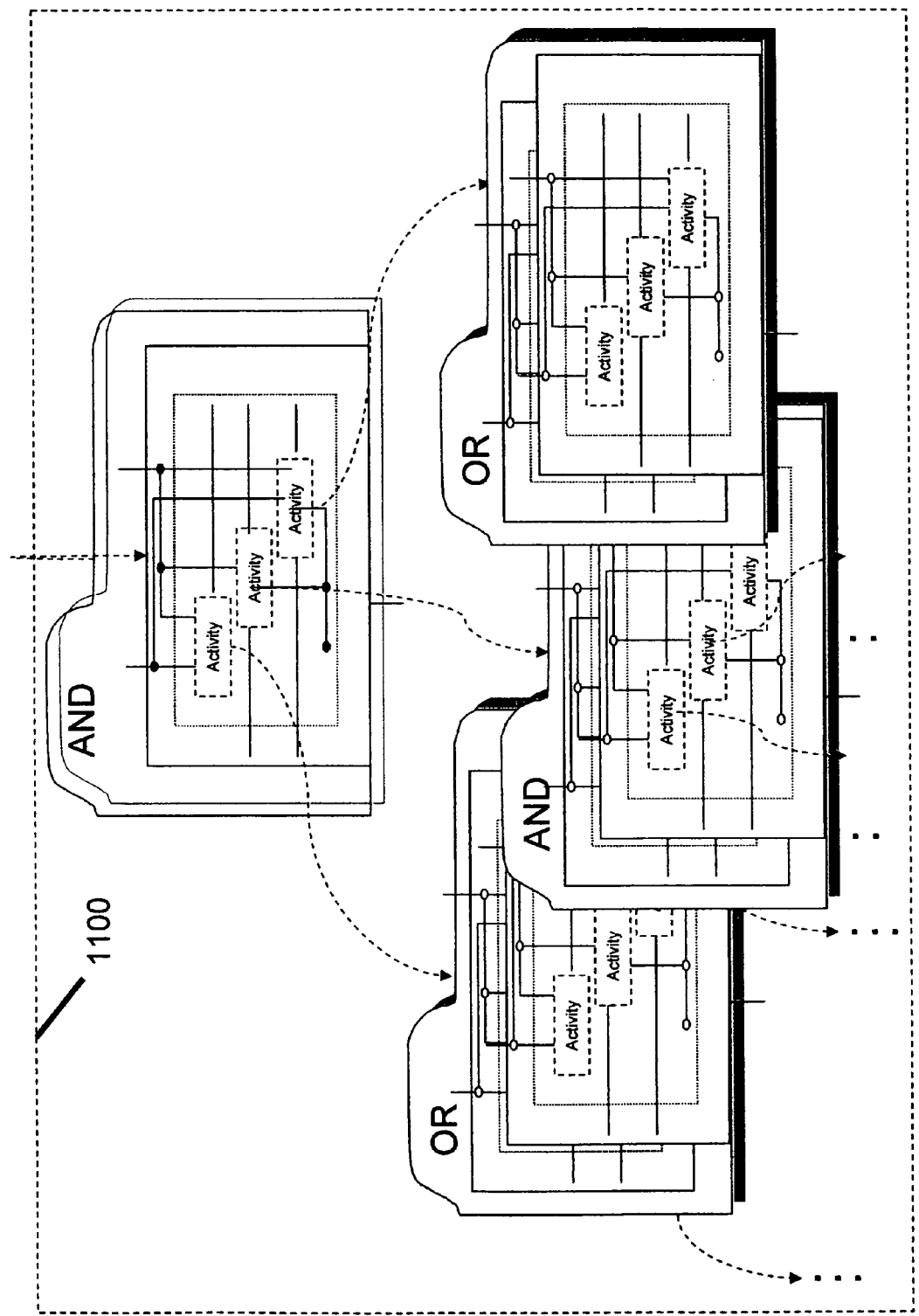
FIG. 11A shows how the catalog of FIG. 10 can be organized into an AND/OR graph for the purpose of representing possible interpretations of database descriptions where each activity context diagram constitutes an OR condition that can be embodied in any one or more of its decompositions, and each decomposition constitutes an AND condition such that every object in the decomposition is matched in the database rows for each patient, or else the AND condition fails.

FIG. 11A shows how an embodiment catalog of FIG. 10 can be organized into an AND/OR graph 1100 for the purpose of representing possible interpretations of database descriptions. An AND/OR search embodiment through this graph is used to produce a partition graph 500 as in the embodiment of FIG. 5. The partition graph 500, sometimes called the search graph, is developed by iteratively choosing a database node for partitioning. Partitioning is sometimes called expanding or opening a database node 503 in the descriptions of published search algorithms.

In an embodiment, an AND/OR search can be guided by heuristic estimates of the value of each database node 503 in the search. There are numerous well known methods for organizing heuristic estimates and using these estimates to efficiently search an AND/OR graph 1100. Some methods are complete, in that they will find a solution if one exists, while others are incomplete. Incomplete search methods may miss a solution that exists, but which they cannot find. The choice of complete or incomplete methods depends on the application.

Embodiment complete methods include, but are not limited to, best-first A*, which chooses the node with the highest value to partition next. B* is a well known complete search technique that outperforms A* when both a cost estimate and a value estimate are available and appropriate for each database node, such as in a chess game embodiment. B* can outperform on A* under those circumstances because it is able to expand fewer database nodes leading to a successful solution.

In an AND/OR search embodiment, the solution subtree is a path from the root node which includes all elements below each AND node and at least one element below each OR node. But both A* and B* are unable to focus the solution subtree 504 properly when the heuristic estimates are not very informative. The estimates for database 503 and partition 501, 502 values and costs should be related to the specific embodiment application. When these are not available in an embodiment, incomplete methods are used.

Beam search is an embodiment of an incomplete method that keeps only a specified number K of database nodes. When a new database node is added to the list of K database nodes remaining to be searched, the new database node is immediately evaluated using available heuristic estimates for value, and possibly for cost. In some embodiments, database nodes that are of low value or high cost, or which have a low value to cost ratio, can be eliminated from further search if they are not among the K most valuable, least cost database nodes.

Beam search is an effective embodiment when there is very little history or understanding of a database application to be searched. In such a case, beam search can help the engineers explore useful models, heuristics, partitioning methods, and methods for generating new knowledge in the form of new databases 503, tables 200, columns 220, domains 210, constraints 300, and extended IDEF0 activity models 1000. As knowledge grows, if better heuristic estimates for correct and effective search are discovered, beam search can later be replaced by A*, B* or other search methods, whether complete or incomplete.

In a speech recognition or understanding embodiment, hidden Markov models (HMMs) can be used to estimate the probability of a word or phrase. HMMs can be used in embodiments for linguistic studies of phrase structures, collocations, selectional restrictions, noun phrases, verb signatures, and other linguistic objects of interest. HMMs are provided in the Elk tool embodiment to be used in the set of search heuristics estimates. Elk is a tool embodiment described in FIGS. 15, 16, 19 and 21.

FIG. 11B describes an embodiment called the English Logic Kernel (Elk). In FIG. 11B, stylized English statements presented to Elk are translated into their equivalent first order logic statements. Statements 1101 and 1102 illustrate English phrases that are commonly used in a pharmaceutical context. Phrases 1105 and 1106 are sometimes embedded into larger phrases that describe a drug and its effects, its contraindications, and other facts about the drug. In this case, phrase 1105 indicates that Vicodin, which is a brand name drug, contains a medication named acetaminophen, while phrase 1106 states that Vicodin contains a medication named hydrocodone. In the Elk embodiment, in phrases 1101, 1102, 1112 and 1114, symbols that start with an underscore ("_") are considered variable symbols which can take on other variables and constants as their values, while those without an initial underscore are constant symbols. Phrases 1103 and 1104 are the first order logic equivalents to the English phrases in 1101 and 1102. These phrases are similar to those in the programming language Prolog, a commonly used first order logic programming language, which can be used in an embodiment of the invention. Phrases 1107 and 1108 are first order logic equivalents to 1105 and 1106.

The Elk embodiment translates stylized English phrases into first order logic phrases, and subdivides longer English sentences into phrases through the database partitioning method. In this embodiment, Elk translates the meaning of English phrases into a sequence of first order logic phrases. The conjunction of all these first order logic statements is logically equivalent to the original English statements.

Figure 21:
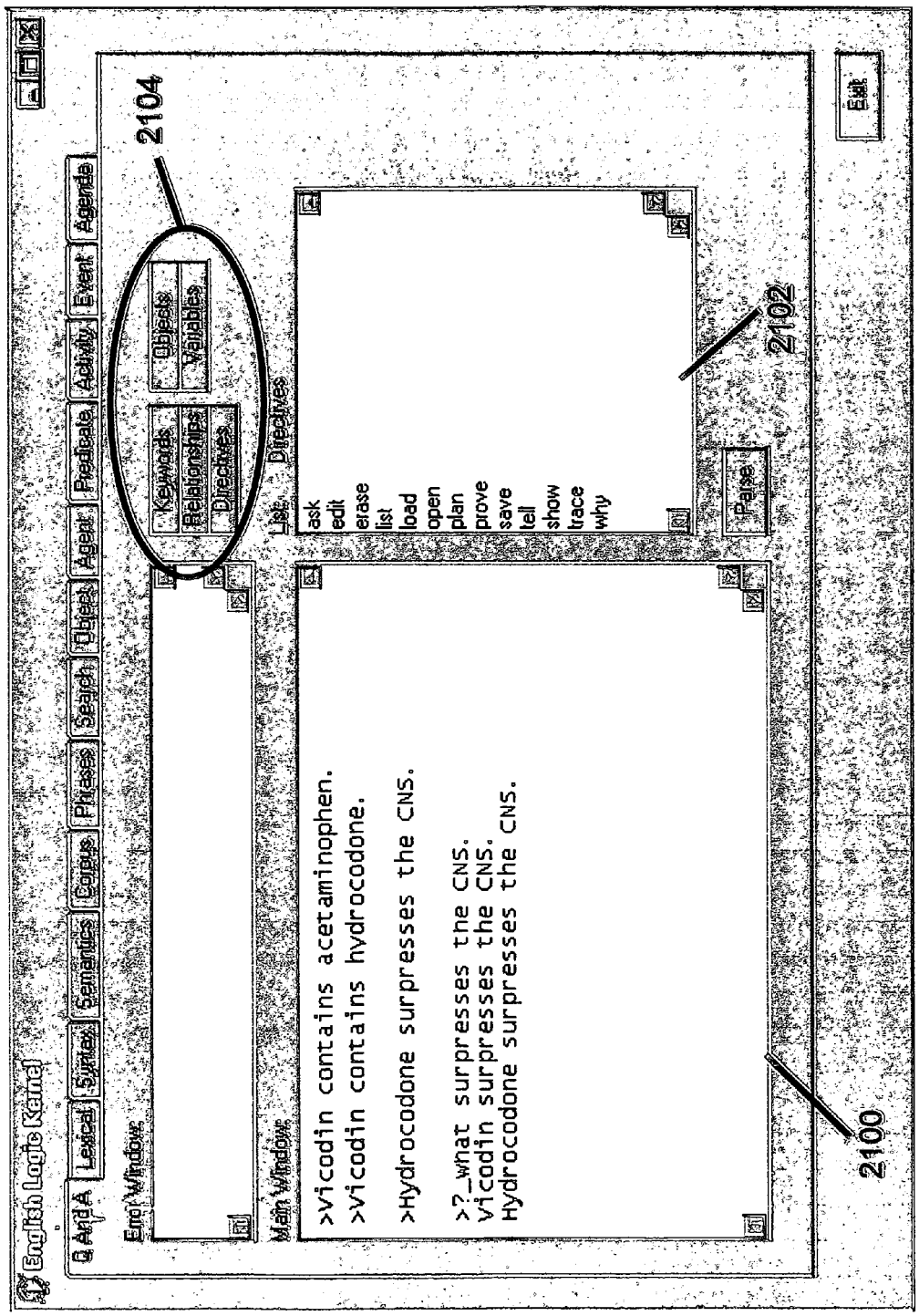
FIG. 21 describes an embodiment (Elk) for developing and testing theories about the evolving knowledge in which first order logic statements of facts and rules can be entered into the main window 2100 by engineers during the theorizing process.

Phrase 1109 and its first order logical equivalent 1110 indicates the postulate that Hydrocodone surpresses the CNS (Central nervous system). Statement 1112 and its first order logic equivalent 1113 indicate a rule that if any medication surpresses the CNS, and some brand contains that same medication, then that brand surpresses the CNS. The question in phrase 1114 asks what medications surpress the CNS, while its answers are immediately displayed after the question. The first order logic equivalent of the question and its responses is shown in 1115. This example is also shown in FIG. 21, where a demonstration of the Elk embodiment is presented.

Figure 12:
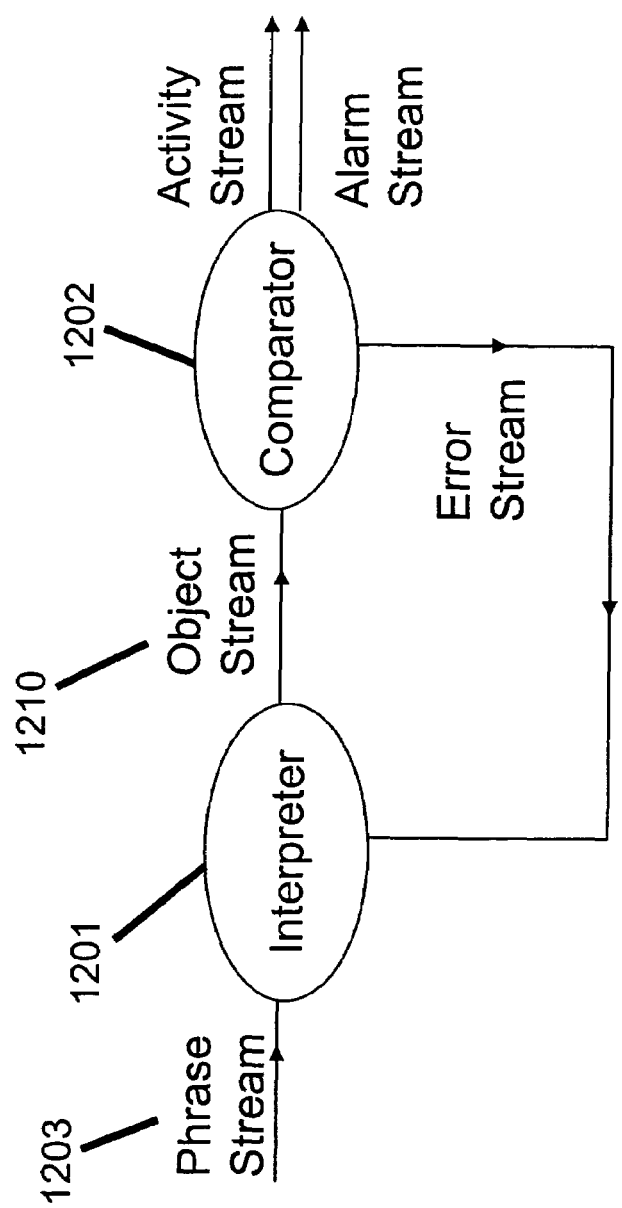
FIG. 12 describes a linguistic feedback mechanism embodiment using an interpreter process and a comparator process which are applied to a stream of words for the purpose of structuring and applying knowledge.

FIG. 12 describes an embodiment comprising a feedback mechanism using an interpreter 1201 process and a comparator 1202 process. The interpreter obtains a stream of phrases 1203 from a database node 503. The interpreter 1201 uses the solution subtree 504 to generate a stream of object descriptions 1210, which it provides to the comparator 1202. The comparator 1202 uses the extended IDEF0 model embedded in the solution subtree 504 to choose a specific set of objects which are mentioned in the labeled solution subtree 504. Together, the interpreter 1201 and the comparator 1202 update the search to prune out unsolvable database nodes, to propagate solvability labeling, to choose the best database node for expansion, to recalculate heuristic estimates, and to guide the search methods.

As each phrase 1203 is encountered, the interpreter 1201 tries to use the phrase 1203 as support for a database node 503 in the solution subtree 504, or as evidence that the database node 503 is unsolvable in the given context. The stream of phrases 1203 may come from a single row in a single column, or it may come from the database nodes 503 that are labeled as being on the marked solution subtree 504. The stream of phrases 1203 may come from structured columns or from unstructured columns or from a mixture of columns.

As each object description 1210 is processed, the comparator 1202 checks to see which database nodes 503 that object 1210 references. All database nodes 503 that have referenced that object's presence and value range are updated to include its observation 1210 in the database node 503. All database nodes 503 that have predicted that the object 1210 will not be observed are updated to be marked as unsolvable. The comparator 1202 and the interpreter 1203 work to enhance search so that the total number of database nodes can be kept to a manageable size.

When an embodiment is first applied to analyze a large database, sometimes very little is known about the heuristics needed to focus the interpreter 1201 and comparator 1202 in searching AND/OR graphs. Later, some empirical knowledge will be developed about the ways in which data is reported into the database. Application dependent informed heuristics can be constructed after contexts have been defined through partitioning and examining the database nodes. The very initial stage of the project requires a broad set of heuristic estimates that can provide enough focus to develop early knowledge, before corpus analysis methods provide support for application focused heuristics. In an embodiment, project management methods are used for this early stage.

Figure 13:
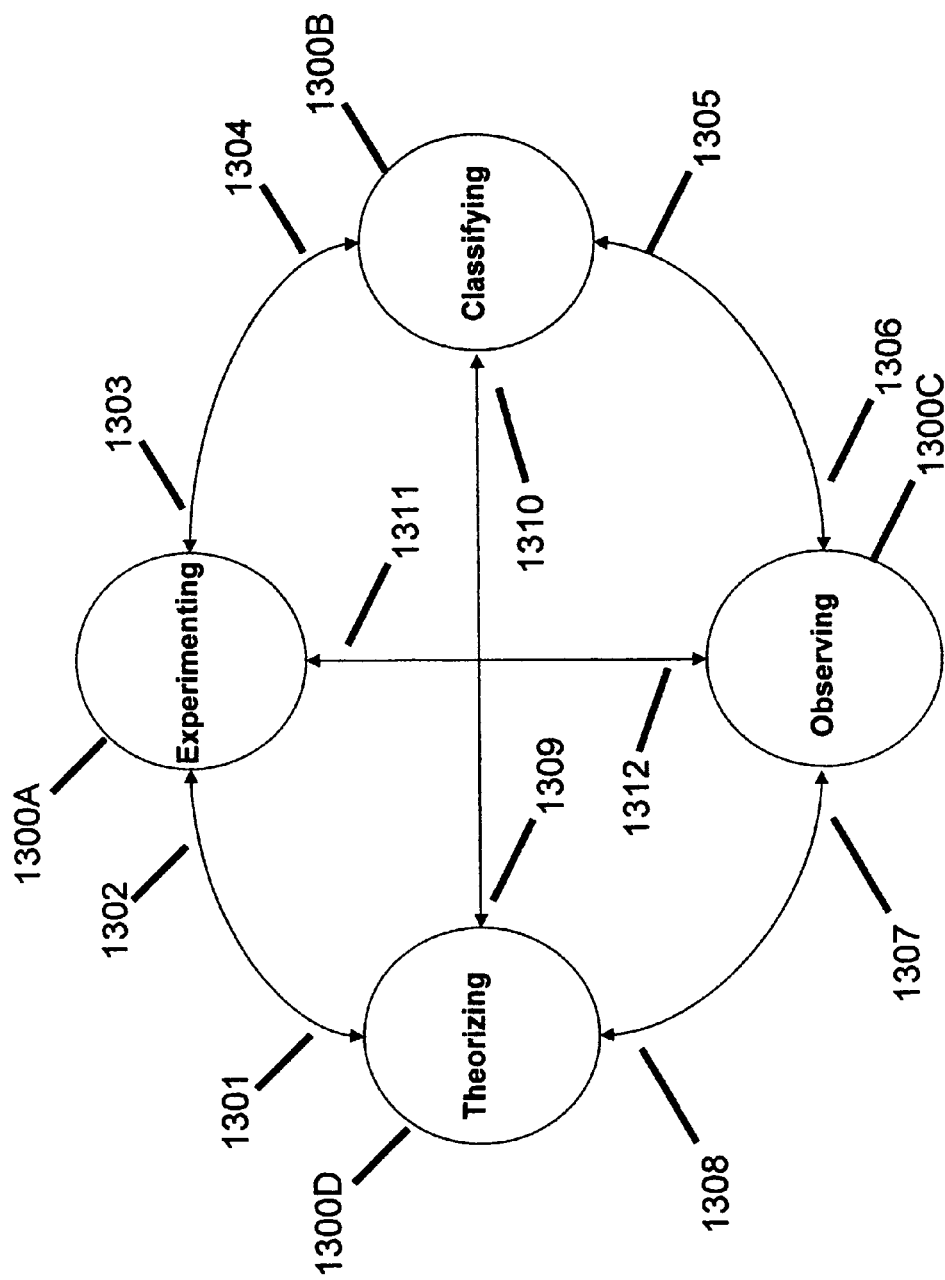
FIG. 13 describes how a cognitive system can be constructed as an embodiment to organize linguistic discovery objects and interfaces; there are four top level processes called experimenting 1300A, classifying 1300B, observing 1300C and theorizing 1300D.

FIG. 13 describes a method for organizing the linguistic discovery process in an embodiment of this invention. FIG. 13 is a model of four interacting processes. The four processes, which can be performed simultaneously, are called theorizing 1300D, observing 1300C, classifying 1300B and experimenting 1300A. There are 12 interfaces in total, numbered 1301 through 1312. There are two interfaces between each pair of processes, one in each direction between the processes. These interfaces 1301 through 1312 show how knowledge that has been generated or refined in any one process is presented for use in each of the other processes. This model is a description of the discovery process which people and programs can use to make new discoveries. The discovery process is one way to organize the interpreter 1201 and comparator 1202 tasks involved in knowledge discovery.

As progress is made in an embodiment project, engineers or software functions may associate specific functions with database node elements. In an SQL embodiment, stored procedures may be used to implement functions. In an object oriented programming language embodiment, such as C++, C#, Java or Delphi, attached processing functions, or function variables, can be used to implement functions for database node elements.

In an embodiment, as the four top level discovery processes interact, functions may be associated with an object or a phrase within a database node. That is, the phrase "_medication surpresses the CNS" can be treated as an event in an object-oriented programming embodiment. Each phrase in a database node 503 can have a unique function defined to represent and process the declarative English phrase, having access to its parameters in first order logic form, as illustrated in FIG. 11B. The word "function" is used in this application to describe the processing routine in any embodiment that is defined for any word, phrase, object or event. In an embodiment, each or any phrase form can be assigned a function of the same number of parameters or can be provided with default values for parameters.

In an embodiment, lookup routines can be used as functions. An embodiment can traverse a concept lattice or class lattice to determine whether a word or phrase is an instance of a class, or a subclass name of a class. Embodiments can use lexical processing routines as functions. Stemming of a word or phrase, correction of misspellings, identification of the role of a word or phrase that is new to the database, and other common lexical routines can be used as functions in embodiments. Syntactic routines can be used as embodied functions. Selection of the head noun in a noun phrase, or identification of the verb in a verb phrase are example embodiments of syntactic functions. Embodied functions can add a table to a database, delete a table from a database, or change a table in a database. Embodied functions can add a column to a database, delete a column from a database, or change a column in a database. Embodied functions can add a row to a table, delete a row from a table, or change a row in a table. Embodied functions can add a database, delete a database, or change a database. Embodied functions can add a domain, delete a domain, or change a domain.

Embodied functions can implement any programmable calculations. Hidden Markov models (HMMs) are examples of embodied functions that can estimate the probability that a given sequence of words and phrases are within a given class. Embodied neural networks provide another method for learning syntactic, lexical and logical structures from linguistic statements. Embodied Bayesian classification functions can identify the class of a word or phrase, or identify the class of larger conceptual structures made from many words, phrases, activities and objects. Embodied pattern recognition functions can identify class membership of numerical estimates and measures as well as classify words, phrases, activities and objects within an embodied classification system. Embodied statistical classification functions can determine the probability of words, phrases, objects and activities within a classification system or a parse tree. Embodied functions can select a partitioning column for a database node, select a processing column, or select a column to be unused in a database node. Embodied functions can perform an iteration or recursion of the methods defined in this disclosure.

To provide embodied recursion triggered by words, phrases, objects or activity events, functions can apply any of the methods of this invention to one or more partitions of a database node, or to entire database nodes. This capability allows the engineers to automate the application of this invention to situations which they consider appropriate to the embodied project.

In an embodiment, a lattice of activity types, objects and agents can be developed. Engineers can organize the models. To perform this task, the engineers will benefit from embodied computer support in the form of a database, processing tools and graphical interface which can let them investigate how well the models work. In an embodiment, the engineers can make changes to the model as required, and as the application itself changes over time.

In an embodiment, theorizing 1300D involves defining or refining activity types, object types and agent types. The engineers can define new activity types, decompositions, object types and agent types. As these types are defined or refined, the models can be updated to incorporate the changes.

In an embodiment, observing 1300C is the process of collecting and examining partition corpora of the various ways in which an agent records events, objects and equipment use in the database. In an embodiment, each database node corpus can be examined by the engineers in the process of observing. The experience gained through observation by engineers will help them suggest new software tools and processes that can help make the four top level discovery processes efficient and effective.

In an embodiment, classifying 1300B is the process by which engineers and functions group the objects into similar classes, called types. In an embodiment, classification 1300B engineers or functions can access the graph of partitions, and apply tools to partition a database according to various structured and unstructured columns. In an embodiment, each partition can be compared as to how the unstructured text columns can be distinguished and further partitioned to produce examples of each object type and its linguistic expression as used by the application agents.

In an embodiment, experimenting 1300A is the process of using corpus samples to analyze the ways in which agents record linguistic descriptions of objects, actions, equipment usage, and situations. To experiment 1300A, an embodiment provides the engineers with the capability to set up temporary, disposable database nodes 503 selected according to the needs of the experiment 1300A. The database nodes can be disposed if not effective, or kept as part of the AND/OR search if found to be useful.

In an embodiment, organizing tasks in this way helps clarify how to measure the effectiveness of expenditures related to development of higher level knowledge from initial database information. By developing intuitive measures of effectiveness in an embodiment, the engineers and functions can measure progress in the model as it is used by the interpreter 1201 and the comparator 1202.

FIG. 14 is a more detailed description of the embodied interfaces among the four subprocesses in FIG. 10. This figure is designed for use in linguistic discovery of databases. Each diagonal entry, labeled 1400A, 1400B, 1400C and 1400D, describes one of the four processes 1300A, 1300B, 1300C, 1300D in the decomposition of the database linguistic discovery process. Each of the 12 interfaces, numbered 1301 through 1312, identifies the effects that knowledge generated from one of the processes can influence discovery of additional knowledge in another process.

In an embodiment, experimenting 1400A is primarily the application of corpus analysis methods on the rows that fall into a partition. The unstructured text columns of each row are lexically analyzed to determine the vocabularies used, the specific phrases that convey useful information, and the variations of phrases used to describe distinctions from other rows that are partitioned into the same partition case.

In an embodiment, classifying 1400B is the embodied process of identifying how to use distinctions among the rows in a partition to categorize those rows that are similar. Classifying 1400B uses clustering methods to identify similarity measures that could prove informative about groups of rows. Each cluster represents a possible new class which can inherit the properties of the higher level class members that are present in the case. Classifying 1400B involves the embodied identification of common similar phrases where variables can be used in place of certain constants in the phrases. This can organize the models in a compressed and effective fashion.

In an embodiment, observing 1400C is the process of grouping rows within a partition. Observing 1400C consists of grouping corpora from similar cases. In an embodiment, the corpora can be lexically and syntactically analyzed and annotated by engineers and functions for further work in the other processes.

In an embodiment, theorizing 1400D is the proposition of relationships among corpus objects. Embodied theorizing 1400D can be based on knowledge aggregated by engineers in the form of inference rules, on good practices for an enterprise, on quality metrics, or on completeness or consistency of activity detection. Given the existing classes in a case, embodied theorizing 1400D can suggest new relationships among the various classes based on the results from the other three processes of observing 1400C, classifying 1400B and experimenting 1400A.

Figure 15:
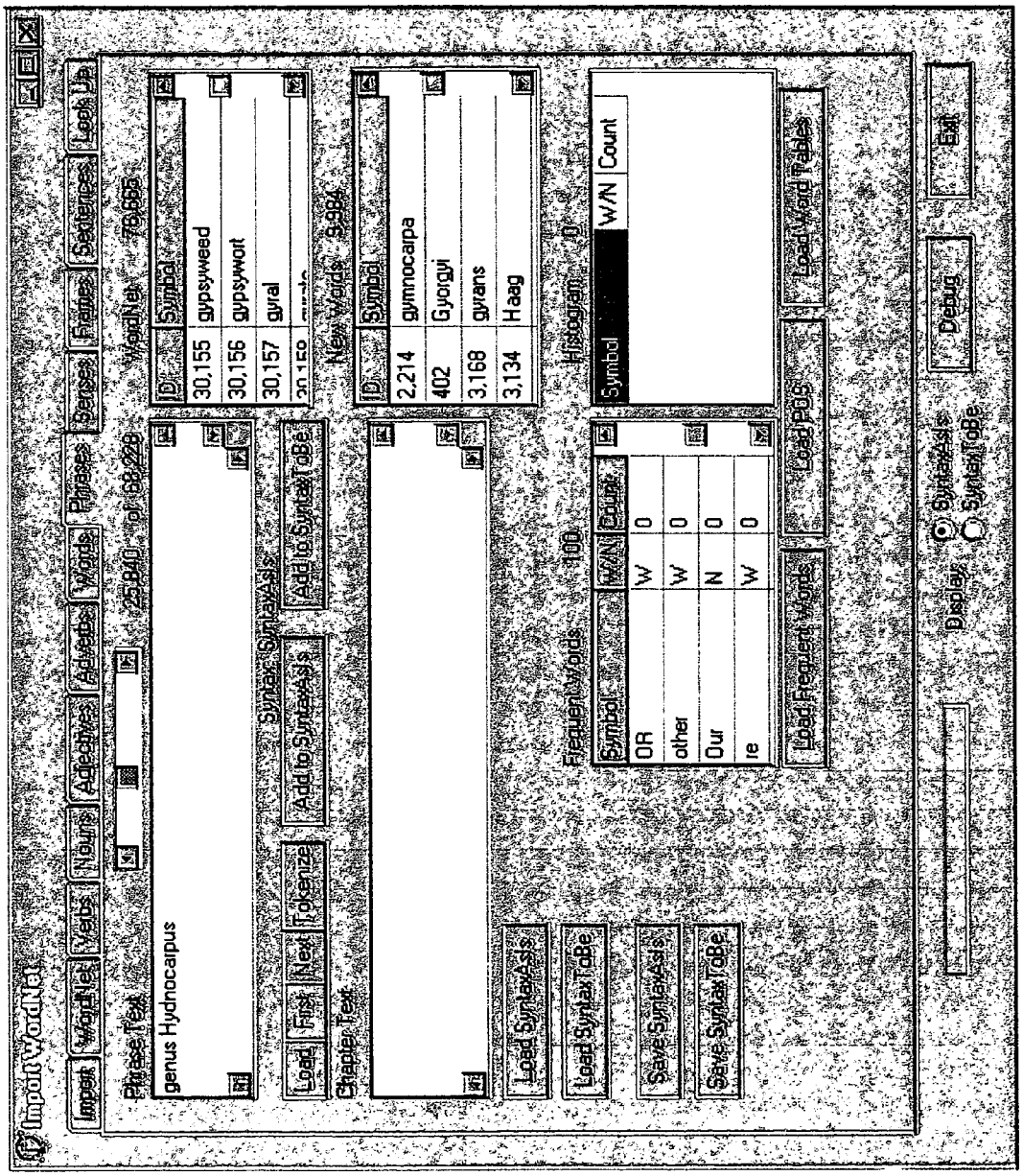
FIG. 15 describes an English Logic Kernel (Elk) tool embodiment for constructing lexical and syntactic databases that can be applied to the linguistic discovery process disclosed herein.

FIG. 15 describes an embodiment lexical resource management tool named "Import WordNet", which is part of the English Logic Kernel (Elk) suite of tools. The purpose of the "Import WordNet" tool is to assist the engineers in identifying a commonly used vocabulary of words and phrases that are found in the databases. WordNet is a lexical resource produced by Princeton University's Cognitive Science department, and provided to linguists. This resource supports identifying all standard words used in a specific database, and by exclusion, words that are not in common English usage, such as very specialized medical vocabularies. It also supports finding the lexicon of words and phrases used in specific contexts, which are subsets of the total vocabulary.

In an embodiment, when a specific class of phrases has been identified through experimenting 1400A, the phrases can be collected into a dictionary for that specific class. This helps the engineers to discover specific words and phrases used to describe activities, objects and agents, as well as patient conditions, for specific contexts, or for specific database nodes. In a medical embodiment, SNOMED, a medical vocabulary of some 340,000 concepts used in medical and health care practice, can be used as a lexical source of concepts and relationships. In a consumer embodiment, WordNet can be used to leverage knowledge about common English word meanings and their mutual interrelationships. This resource is shown being imported into the Elk discovery tool suite in FIG. 15.

Figure 16:
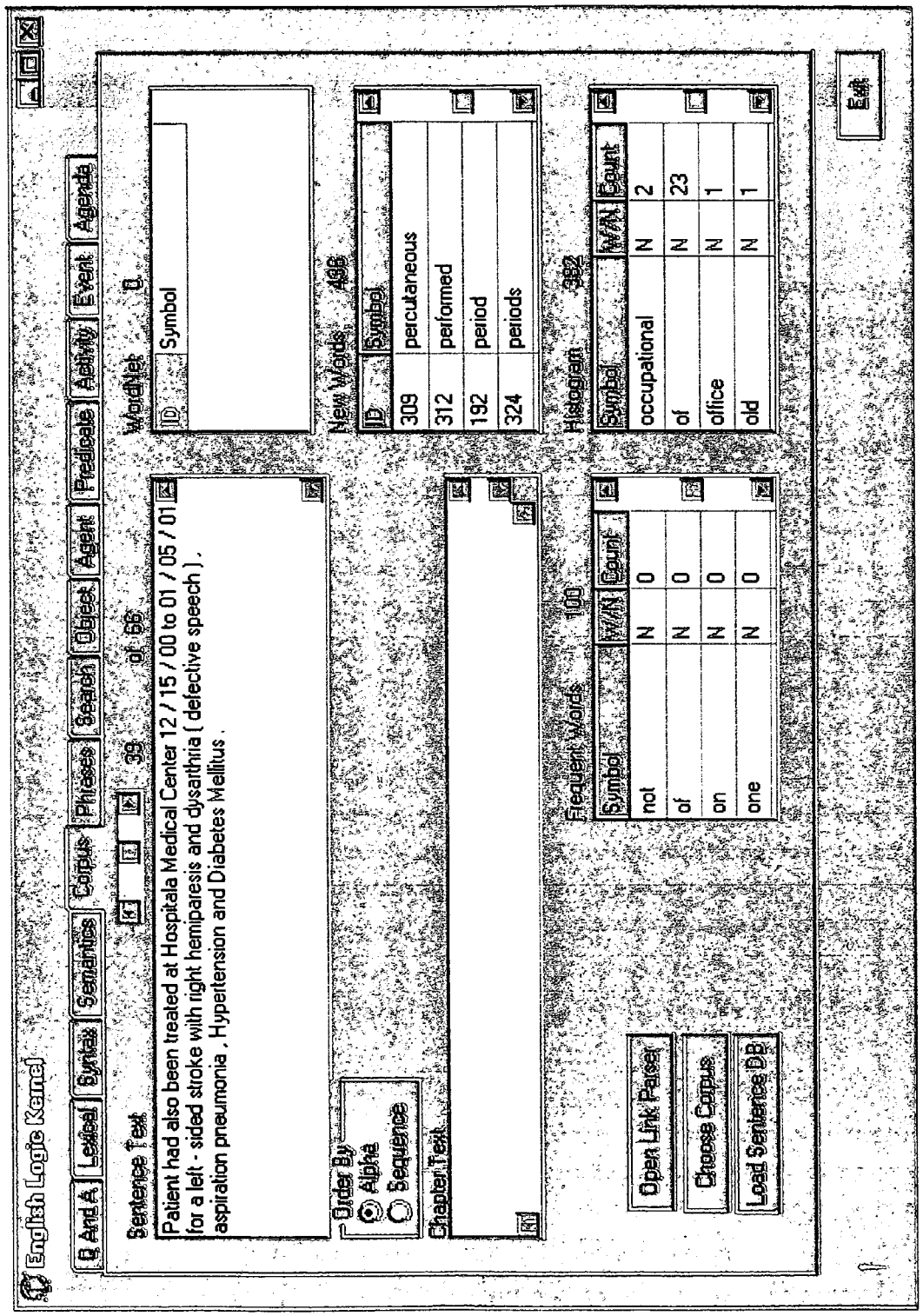
FIG. 16 describes an embodiment of a tool (Elk) for experimenting and observing partitioned databases to extract knowledge from structured and unstructured columns.

FIG. 16 describes a tool in an Elk embodiment for assisting engineers in collecting corpora of text phrases used in medical records partitions. Elk lets the engineers identify the vocabulary of words and phrases in a selected partition or database node. Elk identifies those words that are well-known (i.e., words from a selected dictionary) or words that are outside the normal context of a standard vocabulary for the context, partition or database node represented by the corpus.

Figure 17:
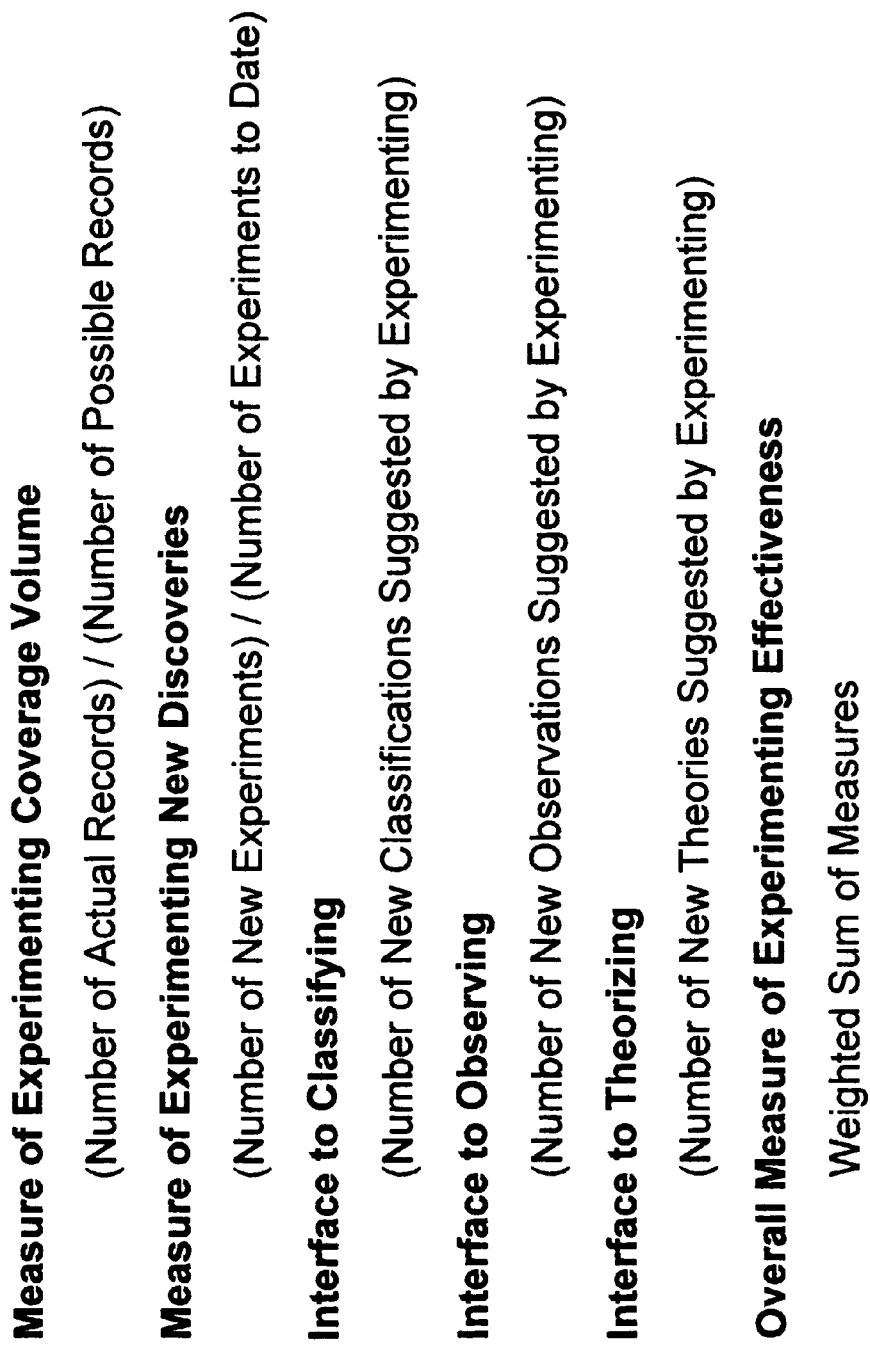
FIG. 17 shows six embodiments comprising estimates and measures of effectiveness for the experimenting process.

FIG. 17 describes measures of effectiveness that can be used in the experimenting 1400A process. Early in a project, an application may have little or no domain knowledge that can be used to guide early progress. The six embodiments of FIG. 17 show an embodiment that can be used to make progress in these early stages. As more domain knowledge is gained from the database, more informed embodiments of measures of effectiveness can be added to, or substituted for, these very general embodiments.

For an embodied structured database column D[i], the maximum number of possible experimental partitions is the number of possible values for D[i]. In a medical records embodiment, given a specific value for D[i], all medical records that have that same value for D[i] fall into the same case. If N[i] is the number of allowable values for D[i], then there are N[i] possible cases. However, some of those possible values may not exist in a given database. So the coverage for an experiment based on partitioning records by D[i] can be defined as (Number of Actual Records)/(Number of Possible Records). In another embodiment, if a range of values, rather than a single value, is appropriate to an experiment, the number of possible rows can be calculated in that embodiment as the number of subranges required to effect the partitioning.

In an embodiment, when discovery processes have progressed, the rows which fall into each database node may then be further partitioned based on another structured column, on the value of functions produced during the discovery process, or on findings from any part of the discovery process. Let P[i] be a method for partitioning the rows in a database node, and let P[i] partition the set of rows into M[i] partitions. The same measure of experimental coverage can apply to this iteration in one embodiment, where coverage is defined as (Number of Actual Rows)/(Number of Possible Rows) for P[i].

As discovery progresses, the number of past experiments accumulates. The engineers develop further partitioning methods, and use them to conduct further experiments. In one embodiment, a measure of the value of conducting a new set of experiments is (Number of New Experiments)/(Number of Experiments to Date).

In an embodiment, experimenting 1400A interfaces with classifying 1400B, observing 1400C and theorizing 1400D. In an embodiment, engineers calculate a measure of the effectiveness of how the experimenting 1400A process assists in these other processes. The interface 1403 to classifying 1400B can be measured in an embodiment by tracking the (Number of New Classifications Suggested by Experimenting). The interface 1411 from experimenting 1400A to observing 1400C can be measured in an embodiment as (Number of New Observations Suggested by Experimenting). The interface 1402 from experimenting 1400A to theorizing 1400D can be measured in an embodiment as (Number of New Theories Suggested by Experimenting).

The overall effectiveness of the experimenting process in an embodiment can be estimated by a (Weighted Sum of Experimenting Measures). In an embodiment, this measure can guide the AND/OR search process by helping to rate cases that have high effectiveness as likely to be productively investigated when compared to cases that have low effectiveness.

Figure 18:
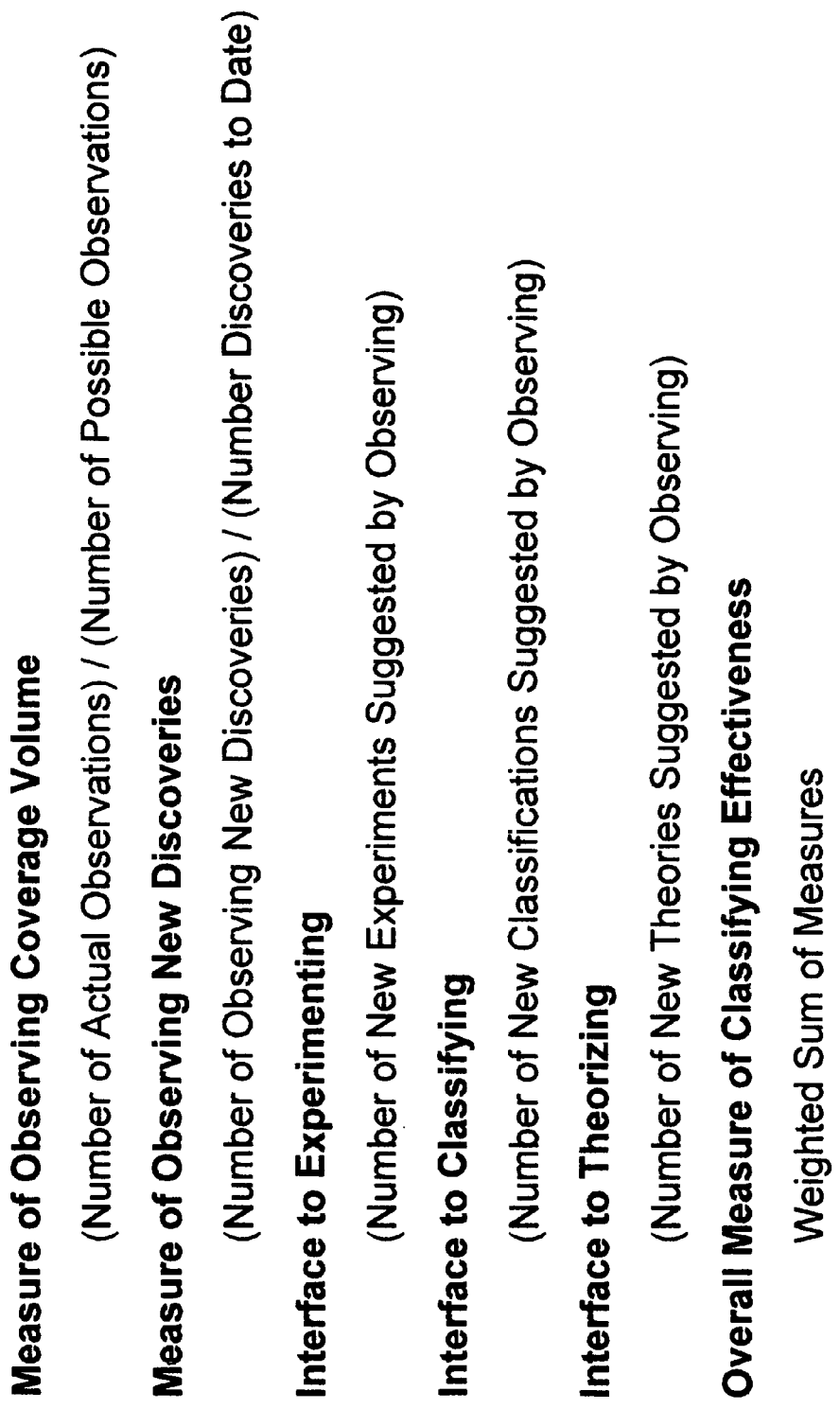
FIG. 18 describes very general embodiments for initial measures of effectiveness for assessing results of the observing process.

FIG. 18 shows measures to be used in one initial embodied observing process 1400C. These include the coverage of observing, the number of possible new discoveries while discoveries are accumulating, and a measure of the effectiveness of the observing 1400C process on experimenting 1400A, classifying 1400B, and theorizing 1400D. The coverage of observing in an embodiment is defined as (Number of Actual Observations)/(Number of Possible Observations). The effectiveness of observing's 1400C interface 1412 with experimenting 1400A can be measured in an embodiment as (Number of New Experiments Suggested by Observing). For the interface 1406 with classifying 1400B, effectiveness in an embodiment can be measured as (Number of New Classes Suggested by Observing). The interface 1407 to theorizing 1400D can be measured in an embodiment as (Number of New Theories Suggested by Observing).

As in FIG. 17, efficient embodiments of measures of effectiveness can be added or substituted to these initial ones after empirical knowledge has been developed from the database.

The overall effectiveness of the observing 1400C process in an embodiment can be estimated by a (Weighted Sum of Observing Measures). This measure can guide the AND/OR search process by helping to rate cases that have high effectiveness as likely to be productively investigated as compared to cases that have low effectiveness. In later stages of an embodiment, more effective measures may be developed and used in addition to, or in place of, these initial measures.

Figure 19:
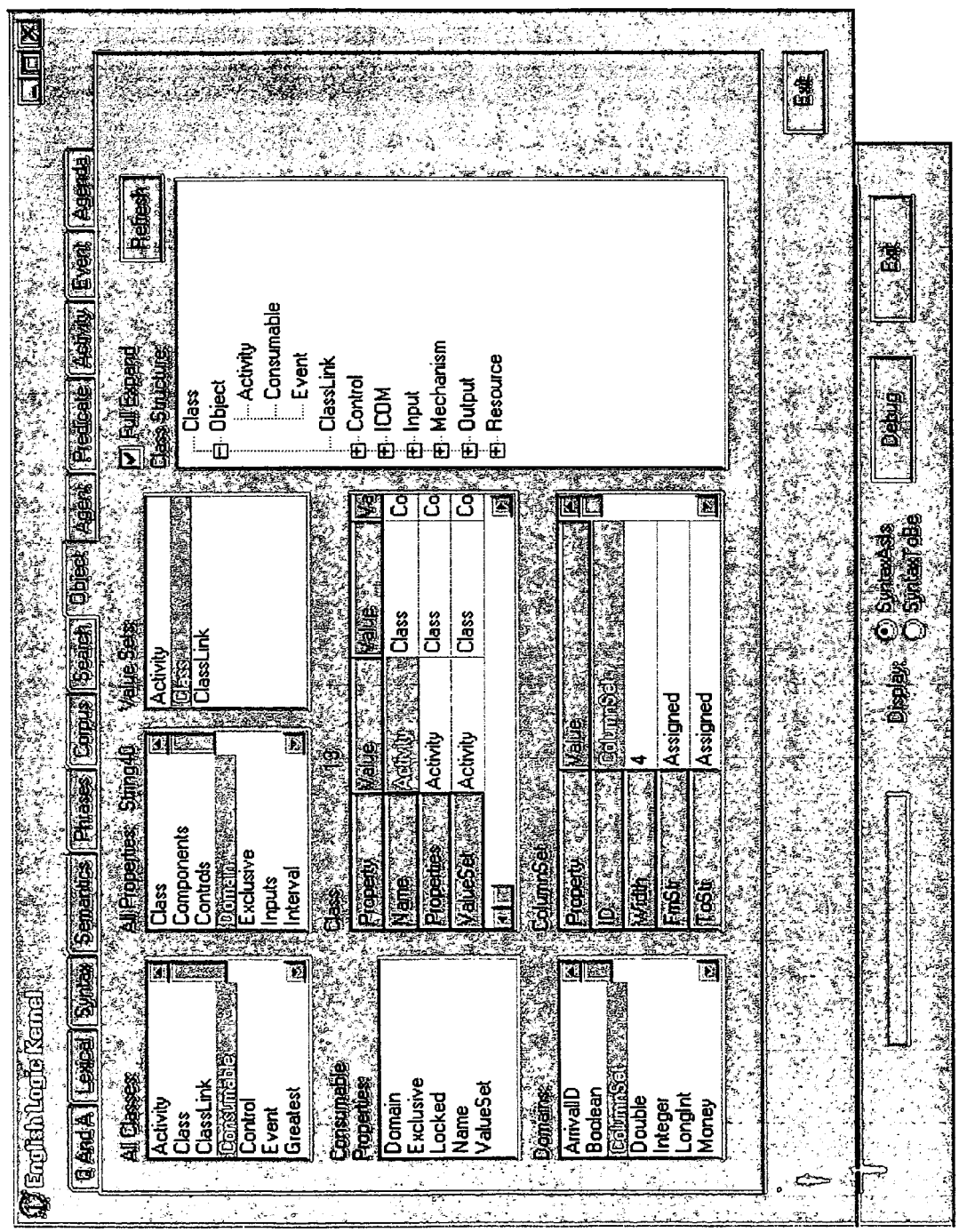
FIG. 19 describes an embodiment (Elk) for class and relationship modeling of the knowledge extracted from partitioned databases using the object type-subtype, type-instance, and whole-part relationship modeling needed to support such resources as IDEF0 activities and objects, WordNet, SNOMED, and general linguistic resources.

FIG. 19 is another view of an Elk embodiment. It shows a class and relationship modeling tool that supports engineers in their classifying 1400B process. Each class is defined by a name and a set of attributes that belong to members of the class. To define subclasses in this embodiment, the engineer can use this tool to define the subclass as one that can inherit any of the attributes of a parent class, or can redefine certain attributes, or add new attributes, further specializing the new subclass. In this embodiment, classes can be divided into subclasses by defining predicate expressions that are true of each class. In another embodiment, classes can be divided into two subclasses using one predicate so that instances for which the predicate is true are in a different subclass than instances for which the predicate is false.

At the highest level in an Elk embodiment, the object class is the ancestor of all other classes. Predefined subclasses include class, classLink, activity, event, and icom, among others. The name "icom" is standard IDEF0 terminology for input 602, control 603, output 604, and mechanism 605 object subclasses. These are predefined subclasses of icom. Resource is predefined as a subclass of mechanism 605. These terms are standard IDEF0 high level modeling terms, and are well understood by engineers. A classLink is a binary relationship between two classes. The classLink can be subclassed into N-ary relationships by defining N binary relationships with a common identifier.

In an embodiment, mechanism 605 can be further refined to include resource and agent classes. In a medical records embodiment, agents such as nurse 706, physician 705, cardiologist and lab tech can be defined. Mechanisms 605 and resources can be defined, such as EEG, ECG, and other subclasses that are dedicated to an activity for a period of time, and then can be dedicated to a different activity. Standard IDEF0 resources in an embodiment can be consumed in whole or in part by activities, so resources could include electricity, or other partially accounted equipment depreciation or material consumption. Standard IDEF0 mechanisms 605 are not consumed, but may be seized during an activity and released when the activity is complete. So EEGs, ECGs and other equipment may be modeled as derived from the mechanism 605 class.

IDEF0 inputs 602 are fully consumed by activity decompositions. Outputs 604, such as lab reports 709 809, are produced by activity decompositions. Other subclasses can be defined as needed to represent the objects and activities of interest to an embodiment. An Elk embodiment provides support to the engineer for developing object-oriented models of objects, their relationships and activities.

IDEF0 controls 603 are objects that describe, authorize, specify or otherwise control activities. Controls 603 can be further subclassed into authorizations. In a medical record embodiment, authorizations can be further subclassed, such as prescriptions, treatment orders, lab orders, work orders, purchase orders, treatment plans, patient condition reports, side effects, titration levels, potassium level and other commonly experienced health care treatment control factors, enterprise control factors, or controls for other applications.

In an embodiment, additional tools may be developed as well, after further experience with the classifying 1400B process suggests additional requirements for support. Other embodiments can include tools such as UML (Unified Modeling Language) design tools, data modeling tools, class lattices, lexical collections, syntactic, semantic, pragmatic or other tools. In an embodiment, additional tools can be applied to help the engineer maintain high productivity and mission effectiveness.

Figure 20:
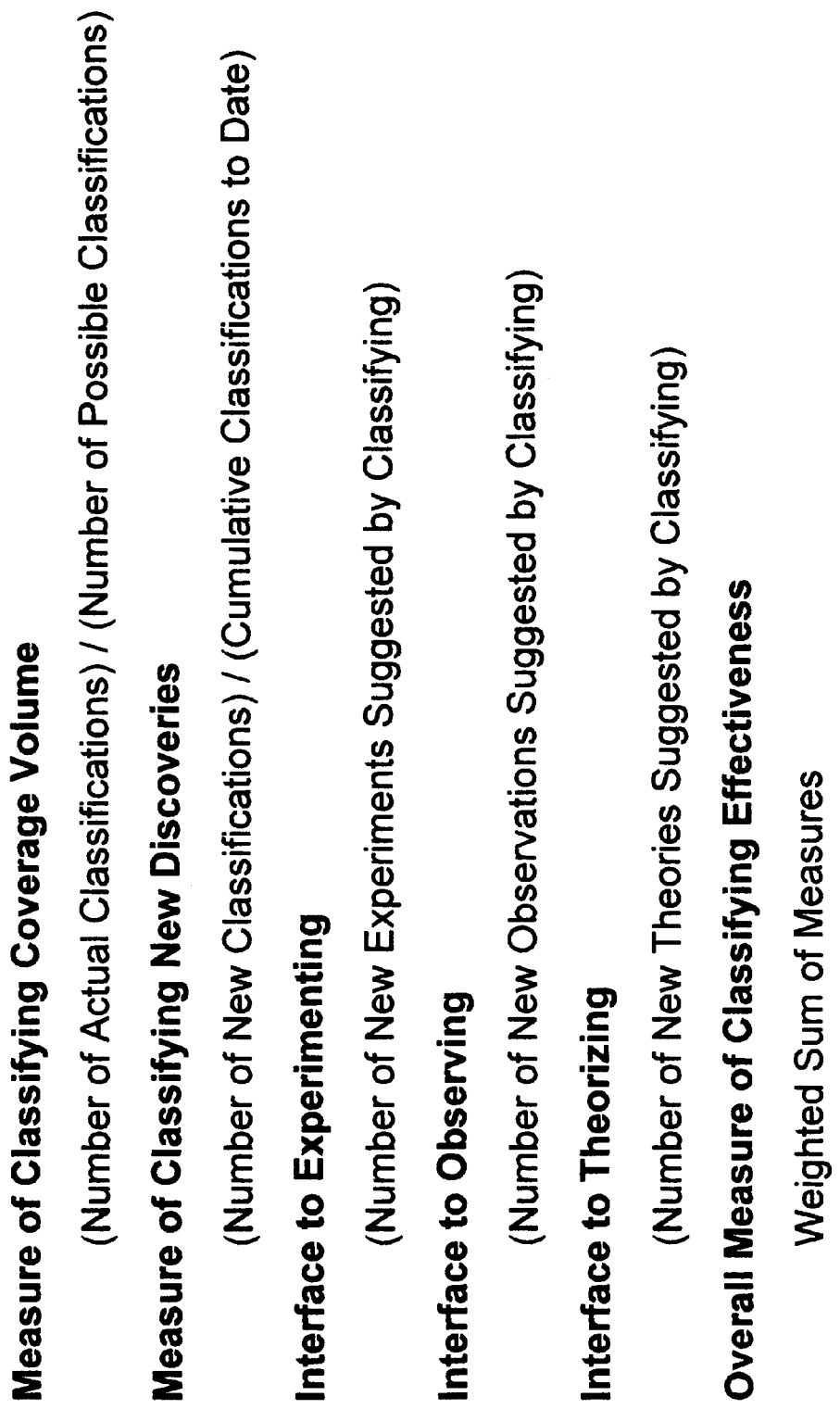
FIG. 20 describes embodied measures of effectiveness for observing results of the classifying process; efficient application dependent embodiments of measures of effectiveness can be added or substituted to these initial ones as empirical knowledge is gathered.

FIG. 20 describes embodied measures of effectiveness that can be used in the initial classifying 1400B process. In an embodiment, coverage volume can be defined as the (Number of Actual Classifications)/(Number of Possible Classifications). In an embodiment, the maximum possible number of classifications can be estimated as the total number of rows having distinct values or value ranges in the database node under classification.

The overall effectiveness of an embodied classifying 1400B process can be estimated by a (Weighted Sum of Classifying Measures). This estimate can guide the embodied AND/OR search process by helping to rate cases that have high effectiveness as likely to be productively investigated as compared to cases that have low effectiveness.

The effect of progress in classifying 1400B can be estimated in an initial embodiment as it causes changes in experimenting 1400A, observing 1400C and theorizing 1400D. These effects can be estimated by counting the number of new classes suggested by an embodied classifying 1400B process. In another embodiment, measures can be based on the (Number of New Experiments Suggested by Classifying), the (Number of New Observations suggested by Classifying), and the (Number of New Theories Suggested by Classifying).

FIG. 21 is another view of an English Logic Kernel (Elk) embodiment for supporting engineers in developing theories 1400D and classifications 1400B. Function embodiments which analyze the partition graph can make use of these rules and facts to select partitioning methods from any database in the partition graph of FIG. 5. In another embodiment, functions can automatically generate facts and rules, which the engineer can observe through the main window 2100.

The Main Window 2100 allows the engineer to enter facts and rules, and to ask questions of the database in first order Horn Clause logic. The Elk embodiment uses backward chaining, with unification, to collect all known answers to each question. Backward chaining, which is well known to engineers, identifies those facts and rules which state the same phrase that the question uses. Any facts that can be unified with the question's variables are then presented as answers. In an embodiment, any rules that conclude a phrase which can be unified with the question's variables are then recursively searched as though their conditional phrases were expressed as queries. Eventually, all relevant rules will have been applied, and only facts will remain, and those facts that can be unified with the ultimate question first asked by the engineer are replied as answers to the original question.

The context display 2102 shows how an embodiment comprising sample theorizing functions can be explored to:

ask questions, obtaining answers from another database node through an open channel of communication;

erase facts and rules from a database node;

list the presently associated facts and rules of a database node;

load another database node, through a channel, merging that database's facts and rules with the present database node;

open a channel of communication to another database node;

plan a sequence of activities that achieve a goal in first order logic;

prove that an answer to a question is true by displaying a chain of its facts and rules;

save a database with associated facts and rules;

tell facts and rules to another database node through an open channel of communication;

show all facts and rules of this database node to another node through a channel;

trace the answers being generated to a question, displaying each fact and rule that is being applied through the chaining mechanism; and explain why an answer to a question is true by sending its proof tree to another database node.

The five buttons 2104 shown in FIG. 21 of this embodiment can be used to switch the context display among various uses to assist the engineer in exploring database nodes.

Keywords are listed in the context window 2102 when the keywords button 2104 is pressed. Keywords are constant words that the engineer has extracted from rows within the database node. Typical keywords in a very general embodiment include a, the, it, and other commonly occurring English words. Typical keywords in a specialized context could include very specific medical or physiological words, as related to the scope of the embodiment.

Objects are listed in the context window 2102 when the button labeled objects 2104 is pressed. The objects listed include objects that have been recognized by the interpreter 1201 and comparator 1202. In an embodiment, as each database node is explored by the engineers or by automatic functions, the objects contained in the database node are associated with the node. In another embodiment, the objects can be extracted from lexical resources like WordNet and SNOMED.

Relationships are the phrases used in facts and rules. When the button labeled relationships 2104 is pressed, all relationships associated with the database node are shown in the context window 2102. In three embodiments, these relationships come from the words and phrases mentioned in the database node, from facts and rules stored in association with the database, or from answers to questions asked of other database nodes.

Variables are named placeholders within relationships. In an embodiment, the relationship "_medication surpresses _ function", the relationship contains two variables—_medication and _function. When the button labeled variables 2104 is pressed, the context window 2102 displays all variables named in any facts and rules, displayed in alphabetical order.

FIG. 22 describes measures for an embodied theorizing 1400D process. The coverage volume can be defined as the (Number of Actual Theories)/(Number of Possible Theories). The maximum possible number of theories can be estimated as the total number of rows in the database for the case under study. The (Number of Theorizing New Discoveries)/(Number of Discoveries to Date) is an embodied initial measure of how useful the theorizing 1400D process has been compared to the other processes.

As embodied theorizing 1400D proceeds, its effect on embodied experimenting 1400A is to suggest new experiments. One measure of effectiveness for theorizing 1400D is the (Number of New Experiments Suggested by Theorizing). For the interface from theorizing 1400D to classifying 1400B, the (Number of New Classifications Suggested by Theorizing) is an embodied measure of effectiveness. The (Number of New Observations Suggested by Theorizing) is an embodied measure of the effect of theorizing 1400D on observing 1400C. The overall embodied effectiveness of theorizing 1400D is a weighted sum of these measures.

FIG. 23 relates the subprocess measures to the overall linguistic discovery process. The coverage measure is the (Number of Actual Discoveries)/(Number of Possible Discoveries). The (Number of Actual Discoveries) can be tracked as the sum of the discoveries of each subprocess. The (Number of Possible Discoveries) can be estimated as the sum of the number of possible discoveries of each subprocess. For any selected period of time, the instantaneous rate of discoveries is the (Number of New Discoveries)/(Cumulative Discoveries to Date), where the (Number of New Discoveries) is measured over that selected period of time, and the (Cumulative Discoveries to Date) is measured by the history of discoveries. The costs of experimenting 1400A, classifying 1400B, observing 1400C and theorizing 1400D can be determined by tracking the labor expended by the engineers and the cost of lost time due to the schedule required for making the discoveries.

The overall measure of discovery effectiveness is proportional to a weighted sum of the measures of effectiveness of the four subprocesses, including the cost of each process and the total cost of discovery, weighted by a negative number.

FIG. 24 describes an embodied implementation plan for generating knowledge by use of a discovery process based on both unstructured text columns and on structured columns. Measurements of performance, effectiveness, success, cost and value are gathered and stored in a history database to track the progress of discovery. A linear system of measures and their effect on system performance is defined. The cost of each process is estimated or determined and used to calculate the best approach for achieving high performance at low cost using heuristically guided AND/OR search. Reviews of the measurements and the deployment process are performed as required to formulate a satisfying strategy for organizing the learning process so that the cost of discovery operations and the quality of knowledge delivery are maximized.

For interactive application embodiments, a user's linguistic phrase or utterance can be used to form a query into a database which has been organized as described above. By applying a search method such as AND/OR search, the query is matched against the database of linguistic statements previously stored into the database and organized using corpus linguistics. By using heuristic methods of search, with complete or incomplete search methods, constructing appropriate heuristic estimates and measurements of similarity to the contexts represented by solution subtrees, the linguistic phrase or utterance can be matched to the most effective previously stored case. Case based analysis can then be applied to retrieve the solution of the most effective previously stored case, and that solution can be applied to the textual phrase or utterance.

Since language is modular, the interactive search method embodiment should include ways to partition the query into component parts that can matched to effective previously stored components. In an embodiment, the solutions for each component are integrated into a solution architecture that matches the solution subtree of the linguistic phrase or utterance, and implements an appropriate response to the linguistic phrase or utterance of the user. In an embodiment, software engineers skilled in the art can develop functions that implement the solution's associated semantic and pragmatic actions, which are performed in response to the user's linguistic phrase or utterance.

In interactive applications, in an embodiment, the user's linguistic phrase or utterance can be stored into the orga nized database, updating the database, to reflect newly acquired experience. In an embodiment, the response to the user's linguistic phrase or utterance can be evaluated. In an embodiment, responses that are appropriate to the context in which the user's linguistic phrase or utterance than an earlier response are stored in the organized database along with evaluation of the response within the context associated with the user's linguistic phrase or utterance.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method for extracting contextual information about a plurality of objects and a plurality of activities from a plurality of tables comprising a plurality of columns and a plurality of rows in a database comprising:
   selecting a number P partitioning columns, said partitioning columns to be used for partitioning said database rows into partitions;
   each said partition comprising zero or more rows, wherein if one or more rows exist, each said row having the same values, or value ranges, in each row and partitioning column in said partition;
   selecting a number R processing columns of said database to be used in extracting information from said database;
   said processing columns comprising structured columns and unstructured columns;
   said unstructured columns including one or more columns containing words or phrases expressed in a language;
   modeling classes and relationships among said plurality of objects and said plurality of activities described by entries in said database;
   searching the said partitions for said contextual information based on the modeling; and
   presenting said contextual information to a user;
   wherein of P and R is greater than zero.

2. The method of claim 1 wherein said tables are added, deleted or updated incrementally.

3. The method of claim 1 wherein said columns are added, deleted or updated incrementally.

4. The method of claim 1 wherein said rows are added, deleted or updated incrementally.

5. The method of claim 1 wherein said partitioning columns are selected incrementally.

6. The method of claim 1 wherein said processing columns are selected incrementally.

7. The method of claim 1 wherein the method is applied recursively to one or more of a plurality of databases.

8. The method of claim 1 further comprising
   a plurality of concepts;
   an assignment of at least one of said concepts to each said partition wherein each said partition is an instance of each concept to which said partition has been assigned.

9. The method of claim 8 wherein
   at least one said assignment of concepts to each said partition results from
   a function applied to said partition.

10. The method of claim 8 wherein
    at least one said assignment of concepts to each said partition results from
    an action made by a human operator.

11. The method of claim 9 wherein said function modifies the structure of said database.

12. The method of claim 9 wherein said function modifies the contents of said database.

13. A method for extracting contextual information about a plurality of objects and a plurality of activities from a plurality of texts comprising:
    annotating each said text with metadata information;
    transforming each said text into one or more database rows that reflect the said annotations through tables and columns of the said database;
    selecting a number P partitioning columns, said partitioning columns to be used for partitioning said database rows into partitions;
    each said partition comprising zero or more rows, wherein if one or more rows exist, each said row having the same values, or value ranges, in each row and partitioning column in said partition
    selecting a number R processing columns of said database to be used in extracting information from said database;
    said processing columns comprising structured columns and unstructured columns;
    said unstructured columns including one or more columns containing words or phrases expressed in a language;
    modeling classes and relationships among said plurality of objects and said plurality of activities described by entries in said database;
    searching the said partitions for said contextual information based on the modeling; and
    presenting said contextual information to a user;
    wherein each of P and R is greater than zero.

14. The method of claim 13 wherein corpus analysis techniques are used to organize the said database.

15. The method of claim 13 wherein said annotation is generated by an algorithm.

16. The method of claim 13 wherein said annotation is produced using a lexical resource.

17. The method of claim 13 wherein
    one text among the plurality of texts is entered by a user;
    the contextual information is formatted into a linguistically acceptable response; and
    the text and the contextual information form an interaction with the user.

18. The method of claim 17 wherein said database is updated after a user's linguistic phrase is entered by said method.

19. The method of claim 17 wherein said interactions performed in response to said user's linguistic phrase is evaluated and possibly said evaluation is stored into said database.

* * * * *